(12) United States Patent
Park et al.

(10) Patent No.: US 10,940,621 B2
(45) Date of Patent: Mar. 9, 2021

(54) PLASTIC-METAL JUNCTIONS AND METHODS OF MAKING THE SAME

(71) Applicant: SABIC Global Technologies B.V., Bergen op Zoom (NL)

(72) Inventors: Hyemin Park, Gyunggi-do (KR); Kihyuk Jang, Gyeonggi-do (KR); Bing Guan, Shanghai (CN); Norio Ozawa, Tochigi-prefecture (JP); Takamune Yamamoto, Tochigi (JP); Norihiko Ohno, Tochigi-prefecture (JP); Jos Van Gisbergen, Noord Brabant (NL); Hongjie Yu, Shanghai (CN)

(73) Assignee: SHPP GLOBAL TECHNOLOGIES B.V., Bergen op Zoom (NL)

(*) Notice: Subject to any disclaimer, the term of this patent is extended or adjusted under 35 U.S.C. 154(b) by 312 days.

(21) Appl. No.: 15/735,065

(22) PCT Filed: Jun. 10, 2016

(86) PCT No.: PCT/IB2016/053452
§ 371 (c)(1),
(2) Date: Dec. 8, 2017

(87) PCT Pub. No.: WO2016/199100
PCT Pub. Date: Dec. 15, 2016

(65) Prior Publication Data
US 2019/0134864 A1  May 9, 2019

Related U.S. Application Data

(60) Provisional application No. 62/173,583, filed on Jun. 10, 2015.

(51) Int. Cl.
*B29C 45/14* (2006.01)
*C09J 167/02* (2006.01)
(Continued)

(52) U.S. Cl.
CPC .. *B29C 45/14311* (2013.01); *B29C 45/14795* (2013.01); *C08L 67/02* (2013.01);
(Continued)

(58) Field of Classification Search
None
See application file for complete search history.

(56) References Cited

U.S. PATENT DOCUMENTS 5,039,727 A * 8/1991 Onishi ................... C08K 5/098
524/277
6,833,094 B1 12/2004 Iikka
(Continued)

FOREIGN PATENT DOCUMENTS

CN 108367467 A 8/2018
DE 102009006375 A1 * 8/2009 ............. B29C 45/73
(Continued)

OTHER PUBLICATIONS

Machine English Translation of DE102013018452, Retrieved Dec. 11, 2019 (Year: 2013).*
(Continued)

*Primary Examiner* — Jacob T Minskey
*Assistant Examiner* — Adrianna N Konves
(74) *Attorney, Agent, or Firm* — Cantor Colburn LLP

(57) ABSTRACT

Various embodiments of the present invention relate to plastic-metal junctions and methods of making the same. In various embodiments, the present invention provides a method of forming a junction between a metal form and a solid plastic. The method can include contacting a metal including a plurality of pores and a flowable resin composition including a polybutylene terephthalate and a polyethylene terephthalate. The method can also include curing the flowable composition to form the solid plastic, to provide the junction between the metal and the solid plastic.

13 Claims, 10 Drawing Sheets

(51) Int. Cl.
*C08L 101/00* (2006.01)
*C08L 67/02* (2006.01)
*B29K 105/00* (2006.01)
*B29K 67/00* (2006.01)
*B29K 705/02* (2006.01)
*B29K 105/16* (2006.01)
*B29K 705/08* (2006.01)

(52) U.S. Cl.
CPC ........... *C08L 101/00* (2013.01); *C09J 167/02* (2013.01); *B29C 45/1418* (2013.01); *B29C 2045/14286* (2013.01); *B29C 2045/14868* (2013.01); *B29C 2045/14877* (2013.01); *B29K 2067/003* (2013.01); *B29K 2067/006* (2013.01); *B29K 2105/0094* (2013.01); *B29K 2105/16* (2013.01); *B29K 2705/02* (2013.01); *B29K 2705/08* (2013.01)

(56) References Cited

U.S. PATENT DOCUMENTS

| | | | |
|---|---|---|---|
| 8,367,210 | B2 | 2/2013 | Naritomi et al. |
| 2002/0186120 | A1* | 12/2002 | Tamura ................... C08L 67/02 338/22 R |
| 2004/0032667 | A1 | 2/2004 | Gale et al. |
| 2006/0055084 | A1 | 3/2006 | Yamaguchi |
| 2006/0257624 | A1 | 11/2006 | Naritomi et al. |
| 2009/0280296 | A1 | 11/2009 | Naritomi et al. |
| 2010/0167016 | A1 | 7/2010 | Manabe et al. |
| 2010/0279120 | A1 | 11/2010 | Naritomi et al. |
| 2011/0155367 | A1 | 6/2011 | Swagerty et al. |
| 2011/0297549 | A1 | 12/2011 | Chen et al. |
| 2012/0190785 | A1 | 7/2012 | Ban et al. |
| 2015/0108088 | A1* | 4/2015 | Naritomi ................... C23F 1/26 216/52 |

FOREIGN PATENT DOCUMENTS

| | | |
|---|---|---|
| DE | 102013018452 | 5/2015 |
| DE | 102013018452 A1 | 5/2015 |
| EP | 1944389 | 7/2008 |
| EP | 2082859 | 7/2009 |
| EP | 2103407 | 9/2009 |
| EP | 2123421 A1 | 11/2009 |
| EP | 2174766 | 4/2010 |
| EP | 2400042 A1 | 12/2011 |
| EP | 2749597 A1 | 7/2014 |
| EP | 2894240 A1 | 7/2015 |
| EP | 2979836 A1 | 2/2016 |
| JP | H01219380 A | 9/1989 |
| KR | 20140049444 A * | 4/2014 |
| KR | 1020180027510 A | 3/2018 |
| WO | WO-2011038741 A1 | 4/2011 |
| WO | WO-20110155289 A1 | 12/2011 |
| WO | WO-2014/0116941 A1 | 7/2014 |
| WO | WO-20150200272 A2 | 12/2015 |

OTHER PUBLICATIONS

Machine English translation of DE-102009006375-A1, Accessed Aug. 12, 2020 (Year: 2009).*
Machine English translation of KR-20140049444-A, Accessed Aug. 12, 2020 (Year: 2014).*
"International Application Serial No. PCT/IB2016/053452, International Search Report dated Oct. 5, 2016".
"International Application Serial No. PCT/IB2016/053452, Written Opinion dated Oct. 5, 2016".
"European Application Serial No. 16739566.4, Communication Pursuant to Article 94(3) EPC dated Feb. 26, 2019", 4 pgs.
"European Application Serial No. 16739566.4, Response filed Jul. 26, 2018", 80 pgs.

* cited by examiner

SHAPE "A"

SHAPE "B"

SHAPE "C"

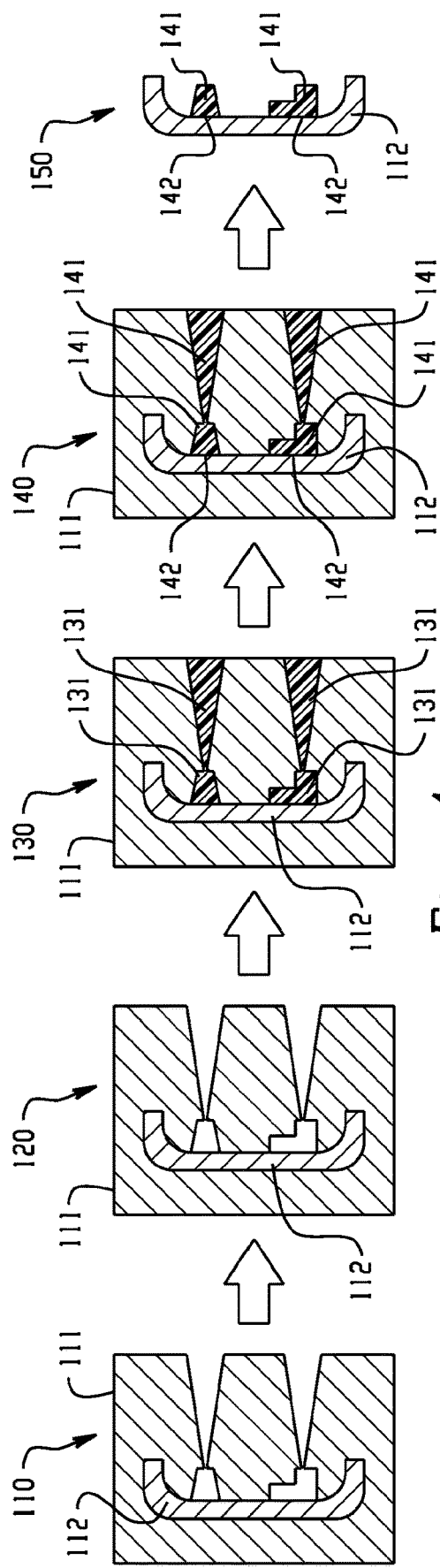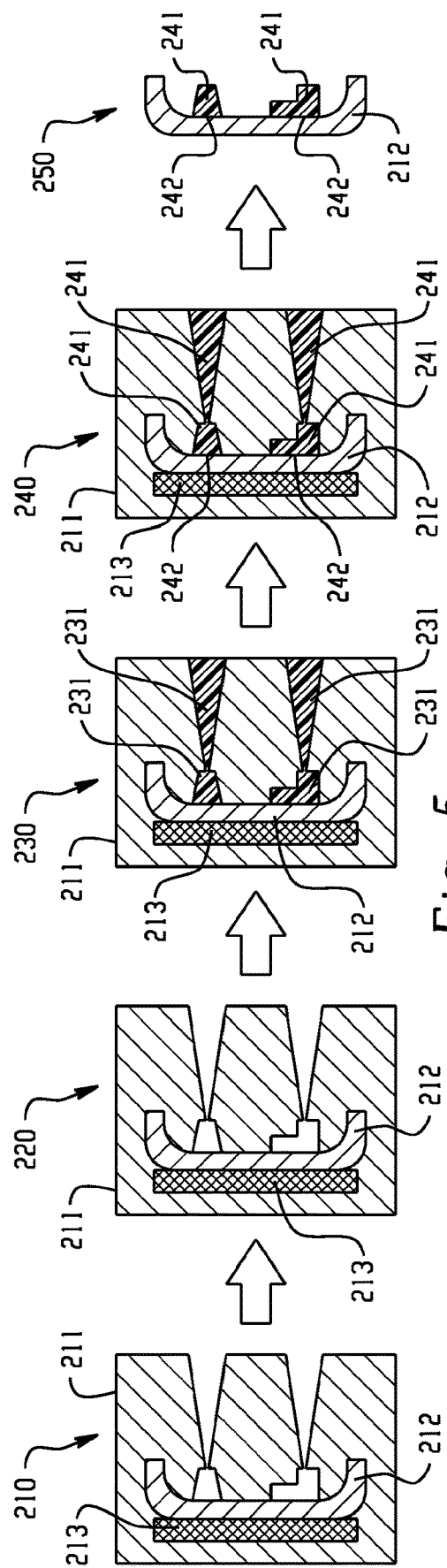

PLASTIC-METAL JUNCTIONS AND METHODS OF MAKING THE SAME

PRIORITY

This application is a U.S. National Stage Filing under 35 U.S.C. § 371 of International Patent Application Serial No. PCT/IB2016/053452, filed Jun. 10, 2016, and published on Dec. 15, 2016 as WO/2016/199100, which claims the benefit of priority to U.S. Provisional Application Serial No. 62/173,583, filed Jun. 10, 2015, the benefit of priority of each of which is claimed hereby and each of which are incorporated by reference herein in its entirety.

BACKGROUND

Bonding strength between plastics and metals can be low without the use of chemical adhesives. For example, it can be difficult to make injection molded polymers such as amorphous polymers come into intimate contact with a metal surface, preventing formation of a strong bond between the metal surface and the injection molded polymer. Polybutylene terephthalate or polyester blends are sometimes used to form junctions between plastic and metal, such as in mobile phones and tablets, due to chemical resistance of the junction, a wide variety of colors possible, and good weathering abilities of the junction. However, bonding strength between metal and polybutylene terephthalate or polyester blends without chemical adhesive can only reach about 30 MPa, which can cause problems such as plastic detachment from the metal during production or consumer use.

SUMMARY OF THE INVENTION

In various embodiments, the present invention provides a method of forming a junction between a metal form and a solid plastic. The method includes contacting a metal including a plurality of pores and a flowable resin composition including a polyester. The method also includes curing the flowable composition to form the solid plastic, to provide the junction between the metal and the solid plastic.

In various embodiments, the present invention provides a method of forming a junction between a metal form and a solid plastic. The method includes contacting a metal including a plurality of pores and a flowable resin composition including a polybutylene terephthalate, a polyethylene terephthalate, and a filler. The polyethylene terephthalate is greater than 30 wt % and less than or equal to about 99 wt % of the flowable resin composition. The filler is about 1 wt % to about 50 wt % of the flowable resin composition. The method also includes curing the flowable composition to form the solid plastic, to provide the junction between the metal and the solid plastic.

In various embodiments, the present invention provides a junction between a metal form and a solid plastic. The junction includes a metal including a plurality of pores and a solid plastic including a polybutylene terephthalate and a polyethylene terephthalate. The solid plastic includes a plurality of anchors, each anchor extending into one of the pores. The polyethylene terephthalate is greater than 30 wt % and equal to or less than about 99 wt % of the solid plastic.

In various embodiments, the present invention provides certain advantages over other plastic-metal junctions, and methods of making the same, at least some of which are unexpected. For example, in various embodiments, the metal-plastic junction can be stronger than other metal-plastic junctions, such as other metal-plastic junctions including polybutylene terephthalate or polyethylene terephthalate. In various embodiments, the metal-plastic junction can have a lower failure rate during production and during use by the consumer than other metal-plastic junctions, such as other metal-plastic junctions including polybutylene terephthalate or polyethylene terephthalate. In various embodiments, the metal-plastic junction can be formed at lower cost than other metal-plastic junctions, other metal-metal junctions, or other single metal equivalents. In various embodiments, the metal-plastic junction can have a lower weight than other metal-plastic junctions. In various embodiments, the metal-plastic junction can be formed using aesthetically pleasing polybutylene terephthalate and polyethylene terephthalate, providing a metal-plastic junction that is more aesthetically pleasing than other metal-plastic joints having similar strength. In various embodiments, the metal-plastic junction can provide advantages over the use of metal or plastic alone, providing the design freedom of plastic to make complex shapes with low weight, and providing the aesthetic and mechanical properties (e.g., stiffness and strength) advantages of metal.

In various embodiments, the present invention provides a method of forming a junction between a metal form and a solid plastic. The method includes heating a roughened surface of a metal form to a temperature at or above a glass transition temperature of a flowable resin composition. The method includes contacting the roughened surface of the metal form and the flowable resin composition. The method includes cooling the roughened surface of the metal form. The method also includes curing the flowable composition to form the solid plastic, to provide the junction between the metal form and the solid plastic.

In various embodiments, the present invention provides a method of forming a junction between a metal form and a solid plastic. The method includes heating a roughened surface of a metal form to a temperature at or above a glass transition temperature of a flowable resin composition; wherein about 40 wt % to about 100 wt % of the flowable resin composition is one or more polymers that are amorphous at standard temperature and pressure. The method includes contacting the roughened surface of the metal form and the flowable resin composition while maintaining the temperature of the roughened surface at or above the glass transition temperature of the flowable resin composition. The method includes cooling the roughened surface of the metal form. The method also includes curing the flowable composition to form the solid plastic, to provide the junction between the metal form and the solid plastic.

In various embodiments, the present invention provides a junction between a metal form and a solid plastic. The junction includes a metal form including a roughened surface and a solid plastic. The roughened surface including a plurality of surface structures each having at least one dimension approximately parallel to the metal surface of about 1 nm to about 1 mm.

The surface structures include convex surface structures, concave surface structures, or a combination thereof. About 40 wt % to about 100 wt % of the solid plastic is one or more polymers that are amorphous at standard temperature and pressure. The solid plastic includes a plurality of anchors, each anchor extending substantially to a bottom of a concave surface structure or substantially to a bottom of a cavity formed between multiple convex surface structures.

In various embodiments, the present invention provides certain advantages over other plastic-metal junctions, and methods of making the same, at least some of which are unexpected. In various embodiments, the method of forming a junction between a metal form and a solid plastic can provide greater penetration of an injection molded material into pores or other surface structures of a metal form, such as more intimate contact between the injection molded material and the metal form, than other methods of forming metal-plastic junctions. In various embodiments, the metal-plastic junction afforded by the method can have a similar or greater bonding strength as compared to corresponding metal-plastic junctions formed using chemical adhesives. In various embodiments, the metal-plastic junction can be easier, faster, and less expensive to form than corresponding chemical adhesive-bonded metal-plastic junctions that require application and curing of chemical adhesives. In various embodiments, the method can produce a metal-plastic junction between a metal and one or more substantially amorphous polymers, providing greater penetration of the amorphous injection molded material into pores or other surface structures of the metal form, such as more intimate contact between the amorphous injection molded material and the metal form, than other methods of forming metal-plastic junctions.

BRIEF DESCRIPTION OF THE FIGURES

The drawings illustrate generally, by way of example, but not by way of limitation, various embodiments discussed in the present document.

FIGS. 4-8 illustrate methods of forming a metal-plastic junction, in accordance with various embodiments.

DETAILED DESCRIPTION OF THE INVENTION

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

In various embodiments, the present invention provides a method of forming a junction between a metal form and a solid plastic. The method can include contacting a metal including a plurality of pores and a flowable resin composition including a polybutylene terephthalate and a polyethylene terephthalate. The method can include curing the flowable composition to form the solid plastic, to provide the junction between the metal and the solid plastic.

Figure 1A:
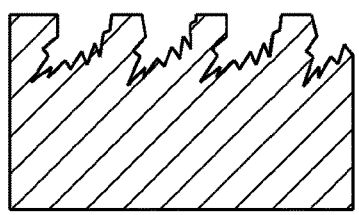
FIGS. 1A-1C illustrates side profile views of various pore shapes, in accordance with various embodiments.
Figure 1B:
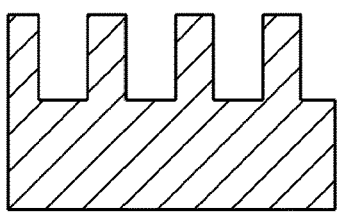
Figure 1C:
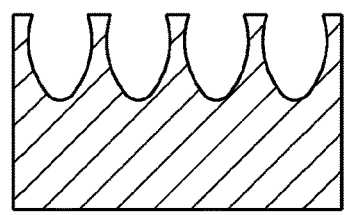

The metal form includes a plurality of pores. The plurality of pores are located in a surface of the metal form, such as directly in the surface of the one or more elemental metals included in the metal, or in the surface or a porous adhesion film on a surface of the metal form. The pores can have any suitable size, shape, and distribution on the metal form. In various embodiments, when viewed from the side, the pores can have an irregular shape, a square or rectangular shape, a circular or oval shape, or any one of these shapes with a jagged or irregular edge. FIGS. 1A-1C illustrates side profile views of various pore shapes. The pores can have any suitable diameter, wherein for non-circular pores the diameter can be considered the largest dimension of the opening of the pore that is approximately parallel to the surface of the metal. For example, the pores can have a diameter of about 1 nm to about 1 mm, about 1 nm to about 1000 nm, about 1 micrometer to about 1000 micrometers, or about 1 nm, 2, 3, 4, 5, 10, 15, 20, 25, 50, 75, 100, 150, 200, 250, 500, 750 nm, 1 micrometer, 2, 3, 4, 5, 15, 20, 25, 50, 75, 100, 150, 200, 250, 500, 750 micrometers, or about 1 mm or more. The pores can have any suitable depth, such as about 1 nm to about 1 mm, about 1 nm to about 1000 nm, about 1 micrometer to about 1000 micrometers, or about 1 nm, 2, 3, 4, 5, 10, 15, 20, 25, 50, 75, 100, 150, 200, 250, 500, 750 nm, 1 micrometer, 2, 3, 4, 5, 15, 20, 25, 50, 75, 100, 150, 200, 250, 500, 750 micrometers, or about 1 mm. The density of the pores can be any suitable density, such as about 1 pore to about 1,000,000,000,000 per square mm, or about 10 pores to about 1,000,000,000 pores per square mm, or about 100 pores to about 1,000,000 pores per square mm, or about 1 pore, 2, 3, 4, 5, 10, 20, 50, 100, 150, 200, 250, 500, 750, 1,000, 2,000, 5,000, 10,000, 20,000, 50,000, 100,000, 500,000, 1,000,000, 2,000,000, 5,000,000, 10,000,000, 100,000,000, 1,000,000,000, or about 500,000,000,000 or more pores per square mm.

In some embodiments, the method can include forming the plurality of pores in the metal form. The plurality of pores can be formed in any suitable way. Forming the pores can include at least one of chemical etching, oxidation, plasma etching, laser etching, and machining. In some embodiments, the pores are in a porous adhesion film on the metal (e.g., a porous coating formed by chemical reaction with the metal). Forming pores in an adhesion film can include forming the adhesion film on a surface of the metal form, such that during formation of the adhesion film the pores are formed in the adhesion film. Forming pores in an adhesion film can include forming the adhesion film and simultaneously or subsequently forming pores in the film.

Figure 2A:
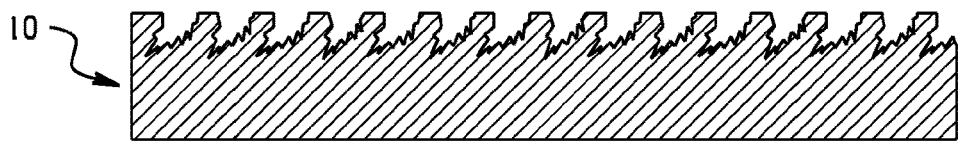
FIGS. 2A-2B illustrate a porous metal form before (FIG. 2A) and after (FIG. 2B) contacting with a flowable resin composition, in accordance with various embodiments.
Figure 2B:
Figure 2C:
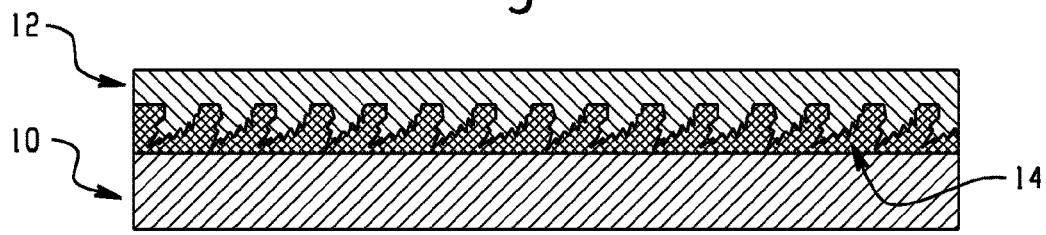
FIG. 2C illustrates a porous metal form including an adhesion film after contacting with a flowable resin composition, in accordance with various embodiments.

The method can include contacting the metal form and a flowable resin composition. The contacting can include contacting pores in the metal form (e.g., pores in the elemental metal included in the metal form) and the flowable resin composition. The contacting can include contacting pores in a porous adhesion film (e.g., a porous coating formed via chemical reaction with the metal) on the metal form and the flowable resin composition (e.g., the contacting need not include contacting the flowable resin composition and the elemental metals included within the metal form, provided that a porous adhesion film on the metal form is contacted by the flowable resin composition). The contacting can include penetrating the pores with the flowable resin composition before the curing, such that the flowable resin composition substantially fills the majority of the pores (e.g., fills about 50 vol % to about 100 vol % of the pores, such as the average vol % of all filled pores, or about 90-100 vol %, or about 50 vol % or less, or about 55 vol %, 60, 65, 70, 75, 80, 82, 84, 86, 88, 90, 92, 94, 95, 96, 97, 98, 99, 99.9, or about 99.99 vol % or more). Contacting the metal form and the flowable resin composition can include injection molding the flowable resin composition, such that the flowable resin composition is heated and under pressure when contacted with the metal form. The injection molding process can be any suitable injecting molding process. FIGS. 2A-C illustrate a contacted metal form (10) and a flowable resin composition (12) as shown in FIGS. 2A and 2B, and a contacted metal form including a porous adhesion film (14) and a flowable resin composition as shown in FIG. 2C.

The method can include heating the metal form (e.g., heating the porous surface of the metal form), such as heating to, at, or above the glass transition temperature of the flowable resin composition, such as any suitable heating described herein. The heating can occur before contacting the metal form with the flowable resin composition, during contacting the metal form with the flowable resin composition, or a combination thereof. In some embodiments, the heating can include maintaining the temperature of the metal form at or above the glass transition temperature of the flowable resin composition during at least part of the contacting. The maintaining can occur for at least part of the contacting, such as until the flowable resin composition has penetrated the pores to a desired degree. The heating can occur in any suitable way, such as via heating of the mold or via direct heating of the metal form such as by a heating source embedded in the mold or via a heating source inserted into the mold. In some embodiments, the heating and a surface treatment of the metal form to form the porous surface can occur at least partially simultaneously. The heat can be supplied in any suitable way, such as via steam, an electric heater, an induction heater, ultrasonic vibration, a laser heater, a halogen heater, a carbon heater, or a combination thereof. In various embodiments, the heating can occur via any suitable one of the heating techniques illustrated in FIGS. 4-8.

The method can include curing the flowable resin composition to form the solid plastic. The curing can occur in any suitable fashion. In some embodiments, the flowable resin composition is a thermoplastic and curing can include cooling the flowable resin composition to form the solid plastic. In some embodiments, the flowable resin composition is a thermoset and curing can include heating to form the solid plastic. In some embodiments, curing can include exposing to suitable radiation such as UV light to form the solid plastic. Curing the flowable composition can provide the junction between the metal form and the solid plastic.

The method can include cooling the metal form (e.g., cooling the porous surface of the metal form). The cooling can be any suitable cooling. In some embodiments, the cooling is passive cooling, wherein the metal form is allowed to cool without the use of specialized cooling equipment. In some embodiments, the cooling is active cooling. The active cooling can include directly cooling the metal form, a mold including the metal form, or a combination thereof, with one or more coolers.

The solid plastic formed can include a plurality of anchors, with each anchor extending into one of the pores. The anchors can form from the flowable resin composition that extended into the pores.

The bonding strength (e.g., the tensile shear at break) between the metal form and the solid plastic can be any suitable bonding strength, such as about 30 MPa to about 100 MPa, about 40 MPa to about 50 MPa, or about 30 MPa or less, or about 32, 34, 36, 38, 40, 42, 44, 46, 48, 50, 52, 54, 56, 58, 60, 62, 64, 66, 68, 70, 72, 74, 76, 78, 80, 85, 90, 95, or about 100 MPa or more.

In various embodiments, the method can include colorizing the junction, or colorizing the metal form or the solid plastic. In various embodiments, the method can include anodizing the metal form.

Figure 3:
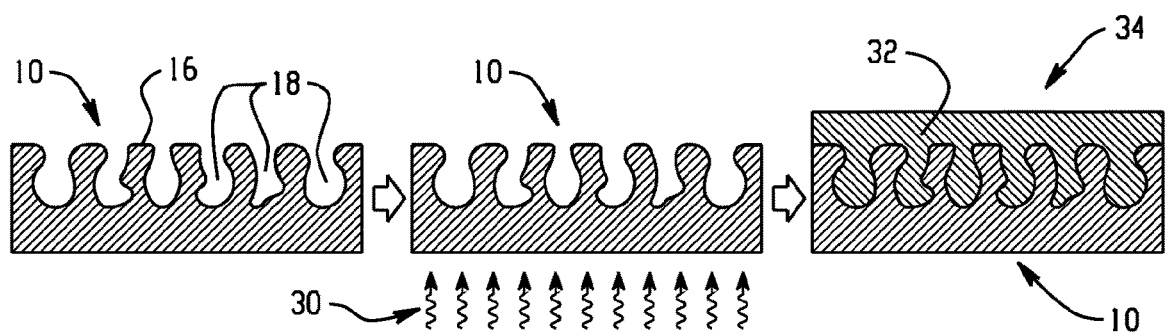
FIG. 3 illustrates a method of forming a junction between a metal form and a solid plastic, in accordance with various embodiments.

Various embodiments of the present invention provide a method of forming a junction between a metal form and a solid plastic. The method can include heating a roughened surface of a metal form to a temperature at or above a glass transition temperature of a flowable resin composition. The method can include contacting the roughened surface of the metal form and the flowable resin composition. The method can include cooling the roughened surface of the metal form. The method can include curing the flowable composition to form the solid plastic, to provide the junction between the metal form and the solid plastic. FIG. 3 illustrates an embodiment of the method. In the left image, a metal form (10) having a roughened surface (16) is provided, wherein the roughened surface includes concave surface features or pores (18). In the center image, the metal form is heated (30) above a glass transition temperature of a flowable resin composition. The right image shows the metal form after it has been contacted with the flowable resin composition (32) and the flowable resin composition has cured to form the article (34) having the junction, wherein 100 vol % of the concave surface features are filled by the cured flowable resin composition, providing a metal-plastic junction with good adhesion.

The roughened surface of the metal form can include surface structures, such as surface structures directly on the metal form, or surface structures on an adhesive film on the metal form. The surface structures can include convex surface structures, concave surface structures, or a combination thereof. The surface structures can have any suitable shape, such as dots, lines, pores, or a combination thereof. The surface structures can be micro surface structures or sub-micro surface structures. The surface structures can have at least one dimension approximately parallel to the surface having the surface structures thereon of about 1 nm to about 1 mm, about 1 nm to about 1000 nm, about 10 nm to about 100 micrometers, or about 1 nm, 2, 3, 4, 5, 6, 8, 10, 12, 14, 16, 18, 20, 25, 30, 35, 40, 45, 50, 55, 60, 65, 70, 75, 80, 85, 90, 95, 100, 125, 150, 175, 200, 225, 250, 300, 400, 500, 600, 700, 800, 900 nm, 1 micrometer, 2, 3, 4, 5, 6, 8, 10, 12, 14, 16, 18, 20, 25, 30, 35, 40, 45, 50, 55, 60, 65, 70, 75, 80, 85, 90, 95, 100, 125, 150, 175, 200, 225, 250, 300, 400, 500, 600, 700, 800, 900 micrometers, or about 1 mm. The at least one dimension can be any suitable linear dimension approximately parallel to the surface, such as length, width, diameter (e.g., pore diameter), and the like. The surface structures can have a height or depth (e.g., pore depth) of about 1 nm to about 1 mm, about 1 nm to about 1000 nm, about 10 nm to about 100 micrometers, or about 1 nm, 2, 3, 4, 5, 6, 8, 10, 12, 14, 16, 18, 20, 25, 30, 35, 40, 45, 50, 55, 60, 65, 70, 75, 80, 85, 90, 95, 100, 125, 150, 175, 200, 225, 250, 300, 400, 500, 600, 700, 800, 900 nm, 1 micrometer, 2, 3, 4, 5, 6, 8, 10, 12, 14, 16, 18, 20, 25, 30, 35, 40, 45, 50, 55, 60, 65, 70, 75, 80, 85, 90, 95, 100, 125, 150, 175, 200, 225, 250, 300, 400, 500, 600, 700, 800, 900 micrometers, or about 1 mm. The surface structures can have any suitable density, such as about as about 1 structure to about 1,000,000,000,000 structures per square mm, or about 10 structures to about 1,000,000,000 structures per square mm, or about 100) structure to about 1,000,000 structure per square mm, or about 1 structure, 2, 3, 4, 5, 10, 20, 50, 100, 150, 200, 250, 500, 750, 1,000, 2,000, 5,000, 10,000, 20,000, 50,000, 100,000, 500,000, 1,000,000, 2,000,000, 5,000,000, 10,000,000, 100,000,000, 1,000,000,000, or about 500,000,000,000 or more structures per square mm. The surface structures together can form the roughness of the roughened surface.

In some embodiments, the method can include forming the roughened surface on the metal form. The roughened surface can be formed in any suitable way. Forming the roughened surface on the metal form can include chemical etching, laser etching, plasma etching, oxidation, machining, forming a roughened coating, or a combination thereof. Forming a roughened coating can include forming an adhesion film, such as forming an adhesion film such that surface structures are formed in the adhesion film. Forming surface structures in the adhesion film can include forming the adhesion film and simultaneously or subsequently forming surface structures in the film.

The method can include contacting the roughened surface of the metal form and the flowable resin composition. The contacting can include contacting the surface structures in the metal form and the flowable resin composition, for example, contacting surface structures in the elemental metal included in the metal form, such that elemental metals in the metal form are directly contacted by the flowable resin composition. The contacting can include contacting surface structures in an adhesion film on the metal form (e.g., wherein the adhesion film can be considered part of the metal form) and the flowable resin composition (e.g., the contacting need not include contacting the flowable resin composition and the elemental metals included within the metal form, provided that an adhesion film including surface structures on the metal form is contacted by the flowable resin composition). The contacting can include penetrating the surface structures with the flowable resin composition before the curing, such that the flowable resin composition substantially fills the majority of concave surface structures such as pores, concave surface structures, or cavities formed between multiple convex surface structures (e.g., such as fills about 50 vol % to about 100 vol % of the cavities or concave surface structure, such as the average vol % of all flowable resin composition-filled concave structures or all filled cavities, or about 90-100 vol %, or about 50 vol % or less, or about 55 vol %, 60, 65, 70, 75, 80, 82, 84, 86, 88, 90, 92, 94, 95, 96, 97, 98, 99, 99.9, or about 99.99 vol % or more). Contacting the metal form and the flowable resin composition can include injection molding the flowable resin composition, such that the flowable resin composition is heated and under pressure when contacted with the metal form. The injection molding process can be any suitable injecting molding process.

The method can include heating a roughened surface of a metal form to a temperature at or above a glass transition temperature of a flowable resin composition. Heating of the roughened surface of the metal form can include heating prior to the contacting of the roughened surface and the flowable resin composition, during the contacting of the roughened surface and the flowable resin composition, or a combination thereof. The heat can be supplied in any suitable way, such via steam, an electric heater, an induction heater, ultrasonic vibration, a laser heater, a halogen heater, a carbon heater, or a combination thereof. The heating and maintaining can be to about the glass transition temperature of the flowable resin composition, or to within or above the glass transition temperature by about 1° C. to about 30° C., 1° C. to about 100° C., or about 0° C. within or above the glass transition temperature, or about 1° C., 2, 3, 4, 5, 6, 8, 10, 12, 14, 16, 18, 20, 22, 24, 26, 28, 30, 35, 40, 45, 50, 55, 60, 65, 70, 75, 80, 85, 90, 95, 100, 110, 120, 130, 140, 150, 175, or about 200° C. within or above the glass transition temperature. In some embodiments, the heating and maintaining can be to about the melting point of the flowable resin composition, or to within or above the melting point by about 1° C. to about 30° C., 1° C. to about 100° C. or about 0° C. within or above the melting point, or about 1° C., 2, 3, 4, 5, 6, 8, 10, 12, 14, 16, 18, 20, 22, 24, 26, 28, 30, 35, 40, 45, 50, 55, 60, 65, 70, 75, 80, 85, 90, 95, 100, 110, 120, 130, 140, 150, 175, or about 200° C. within or above the melting point.

In some embodiments, the contacting the roughened surface of the metal form and the flowable resin composition includes contacting the roughened surface of the metal form and the flowable resin composition while maintaining the temperature of the roughened surface at or above the glass transition temperature of the flowable resin composition (e.g., via heating the mold including the metal form, or by heating the metal form directly such as via a suitable heating source embedded in the mold). In other embodiments, the contacting occurs after the heating. The maintaining can occur for at least part of the contacting, such as until the flowable resin composition has penetrated the surface features to a desired degree.

The heating of the roughened surface of the metal form can include heating a mold (e.g., an injection molding mold) including the metal form, wherein the heating of the mold heats the metal form. The mold can be heated directly or indirectly by the heating source. The mold can be heated in any suitable way, such as via steam, an electric heater, an induction heater, ultrasonic vibration, or a combination thereof. FIG. 4 illustrates a method of forming a metal-plastic junction, in accordance with various embodiments. In the first image 110, a mold 111 is provided. The mold includes a metal form 112 having a roughened surface, which is an insert in the mold 111. In the second image 120, the mold 111 is heated by a heating source (not shown), which heats the metal form 112 to at or above the glass transition temperature of the flowable resin composition. In the third image 130, the flowable resin composition 131 is injected into the mold 111 such that it contacts the roughened surface of the metal form 112.

In the fourth image 140, the metal form 112 is cooled and the flowable resin composition is cured to provide the solid plastic 141. Curing the flowable resin composition to provide the solid plastic 141 forms the metal-plastic junction 142. In the fifth image 150, a metal-plastic hybrid part that includes the metal form 112, the solid plastic 141, and the metal-plastic junction 142, is separated from the mold.

The heating of the roughened surface of the metal form can include directly heating the metal form. For example, the metal form can be heated with a suitable heating source that is embedded in a mold that includes the metal form. The heating source can include an electric heater, an induction heater, ultrasonic vibration, a laser heater, or a combination thereof. FIG. 5 illustrates a method of forming a metal-plastic junction, in accordance with various embodiments. In the first image 210, a mold 211 is provided. The mold includes a metal form 212 having a roughened surface, which is an insert in the mold 211. In the second image 220, the metal form 212 is heated by a heating source 213 that is embedded in the mold 211 that includes the metal form 212, which heats the metal form 212 to at or above the glass transition temperature of the flowable resin composition. In the third image 230, the flowable resin composition 231 is injected into the mold 211 such that it contacts the roughened surface of the metal form 212. In the fourth image 240, the metal form 212 is cooled and the flowable resin composition is cured to provide the solid plastic 241. Curing the flowable resin composition to provide the solid plastic 241 forms the metal-plastic junction 242. In the fifth image 250, a metal-plastic hybrid part that includes the metal form 212, the solid plastic 241, and the metal-plastic junction 242, is separated from the mold.

Figure 6:
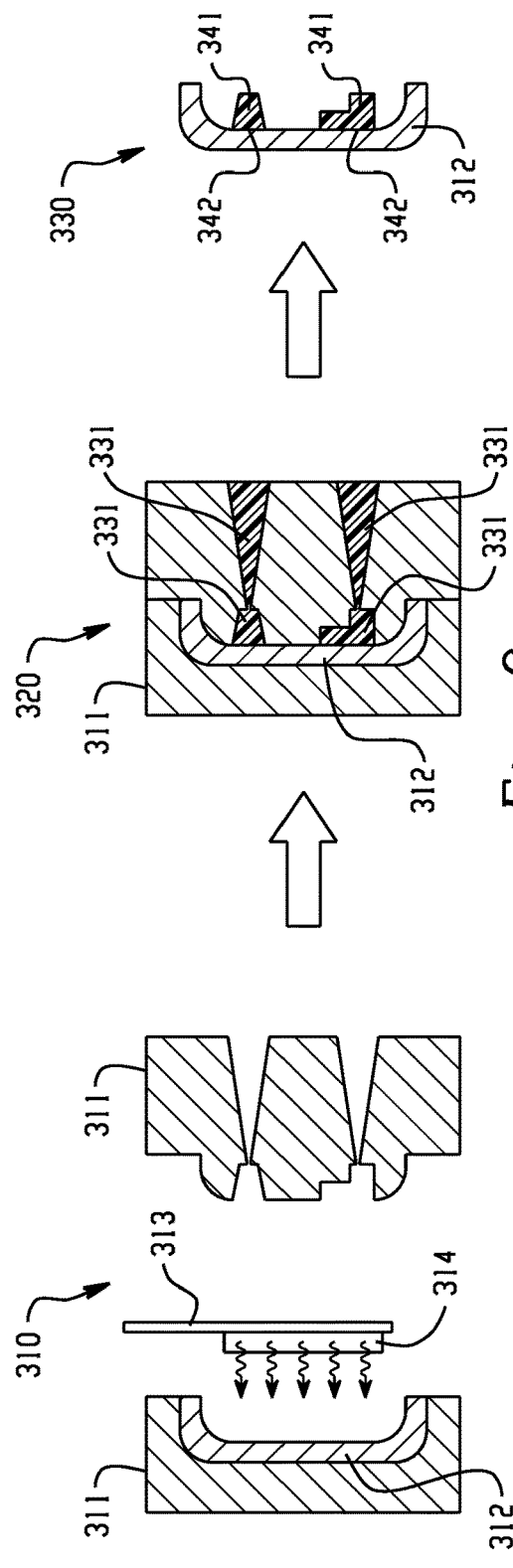

The heating of the roughened surface of the metal form can include heating with a suitable heating device that is inserted in a mold including the metal form or between cavities in the mold prior to the contacting of the roughened surface and the flowable resin composition. The heating device can include a halogen heater, a carbon heater, a laser heater, an induction heater, or a combination thereof. FIG. 6 illustrates a method of forming a metal-plastic junction, in accordance with various embodiments. In the first image 310, a mold 311 is provided. The mold includes a metal form 312 having a roughened surface, which is an insert in the mold 311. The metal form 311 is heated by heating device 314, included in holder 313. The heating device 314 is inserted into the mold 311 prior to the contacting of the roughened surface and the flowable resin composition. The heating device 314 heats the metal form 312 to at or above the glass transition temperature of the flowable resin composition. In the second image 320, the flowable resin composition 331 is injected into the mold 311 such that it contacts the roughened surface of the metal form 312. The metal form 312 is then cooled and the flowable resin composition is cured to provide the solid plastic 341, which forms the metal-plastic junction 342, shown in the third image. In the third image, a metal-plastic hybrid part that includes the metal form 312, the solid plastic 341, and the metal-plastic junction 342, is separated from the mold.

Figure 7:
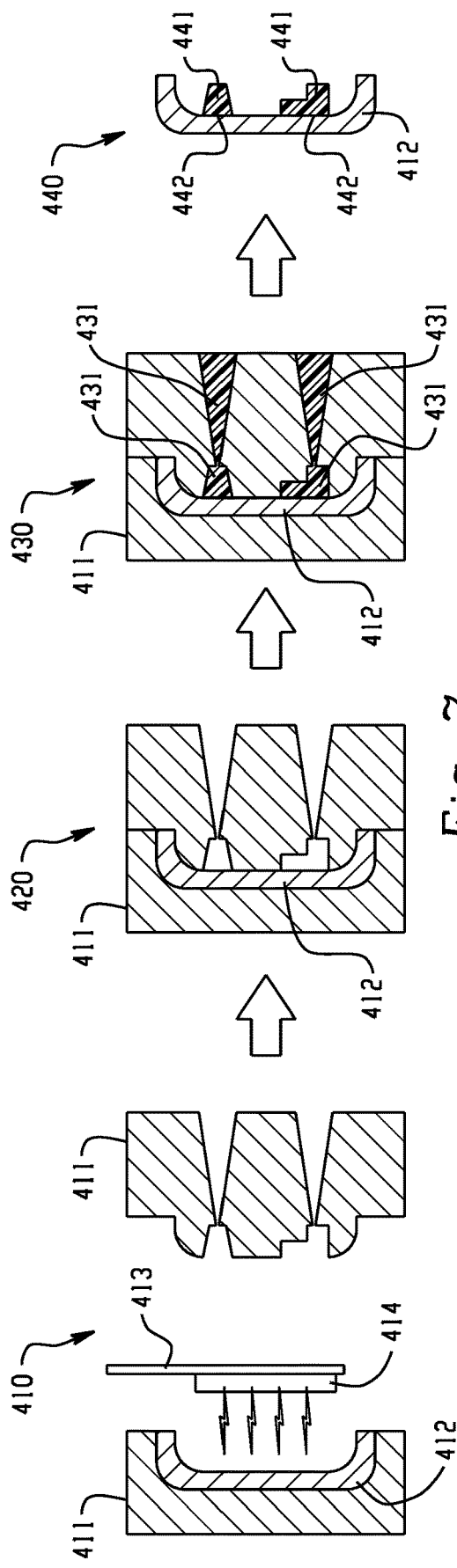

The surface treatment to form the roughened surface of the metal form can include treating the surface with a suitable device that is inserted into a mold including the metal form or between cavities in the mold prior to the heating of the roughened surface of the metal form. The surface treatment can include laser etching, plasma etching, or a combination thereof. The heating of the metal form subsequent to the surface treatment can be performed in any suitable manner described herein. FIG. 7 illustrates a method of forming a metal-plastic junction, in accordance with various embodiments. In the first image 410, a mold 411 is provided. The mold includes a metal form 412, which is an insert in the mold 411. The metal form 412 is subjected to a treatment by a surface treatment device (e.g., laser etching device, plasma etching device, or a combination thereof) 414, included in holder 413. The treatment by the surface treatment device 414 provides a roughened surface on metal form 412. In the second image 410, the metal form 412 is heated by a heating source (not shown), which heats the metal form 412 to at or above the glass transition temperature of the flowable resin composition. In the third image 430, the flowable resin composition 431 is injected into the mold 411 such that it contacts the roughened surface of the metal form 412. The metal form 412 is cooled and the flowable resin composition is cured to provide the solid plastic 441, forming the metal-plastic junction 442, shown in the fourth image. In the fourth image 440, a metal-plastic hybrid part that includes the metal form 412, the solid plastic 441, and the metal-plastic junction 442, is separated from the mold.

Figure 8:
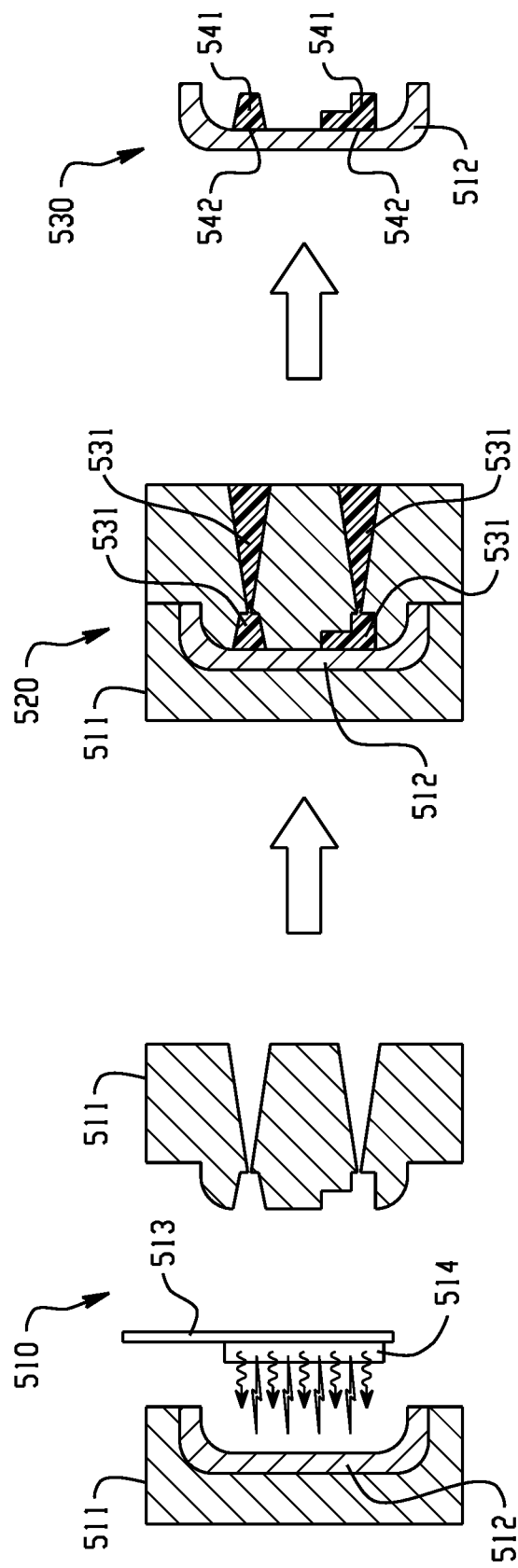

The heating of the roughened surface and a surface treatment to form the roughened surface can be at least partially simultaneous. For example, the heating of the roughened surface and the surface treatment to form the roughened surface can be performed using laser etching, laser heating, plasma etching, a halogen heater, or a combination thereof. FIG. 8 illustrates a method of forming a metal-plastic junction, in accordance with various embodiments. In the first image 510, a mold 511 is provided. The mold includes a metal form 512, which is an insert in the mold 511. The metal form 511 is at least partially simultaneously subjected to a surface treatment and heated by device 514, included in holder 513. The surface treatment/heating device 514 is inserted into the mold 511 prior to the contacting of the roughened surface and the flowable resin composition. The surface treatment/heating device 514 forms a roughened surface, or enhances a previously formed roughened surface. The surface treatment/heating device 514 also heats the metal form 512 to at or above the glass transition temperature of the flowable resin composition. In the second image 520, the flowable resin composition 531 is injected into the mold 511 such that it contacts the roughened surface of the metal form 512. The metal form 512 is then cooled and the flowable resin composition is cured to provide the solid plastic 541, which forms the metal-plastic junction 542, shown in the third image. In the third image, a metal-plastic hybrid part that includes the metal form 512, the solid plastic 541, and the metal-plastic junction 542, is separated from the mold.

The method can include cooling the roughened surface of the metal form. The cooling can be any suitable cooling. In some embodiments, the cooling is passive cooling, wherein the roughened surface of the metal form is allowed to cool without the use of specialized cooling equipment. In some embodiments, the cooling is active cooling. The active cooling can include directly cooling the roughened surface of the metal form, a mold including the metal form, or a combination thereof, with one or more coolers.

The bonding strength (e.g., the tensile shear at break) between the metal form and the solid plastic can be any suitable bonding strength, such as about 1 megaPascals (MPa) to about 100 MPa, about 6 MPa to about 30 MPa, or about 1 MPa or less, or about 2, 4, 6, 7, 8, 9, 10, 11, 12, 13, 14, 15, 16, 17, 18, 19, 20, 21, 22, 23, 24, 25, 26, 27, 28, 29, 30, 32, 34, 36, 38, 40, 45, 50, 55, 60, 65, 70, 75, 80, 85, 90, 95, or about 100 MPa or more.

The metal form can include any suitable metal. The metal form can include one elemental metal or a combination of more than one elemental metal. In some embodiments, the metal form includes aluminum, steel (e.g., stainless steel), iron, copper, titanium, magnesium, or any combination thereof (e.g., an alloy or a heterogeneous mixture). The metal form can include any other suitable materials, in addition to the one or more metals. The one or more elemental metals can form any suitable proportion of the metal form, such as about 50 wt % to about 100 wt %, or about 50 wt % or less, or about 55 wt %, 60, 65, 70, 75, 80, 85, 90, 95, 96, 97, 98, 99, 99.9, or about 100 wt %.

The flowable resin composition can be any suitable flowable resin composition, such that the method can be carried out as described herein. The flowable resin composition can be a thermoplastic, a thermoset, or a combination thereof. Curing the flowable resin composition can include cooling the flowable resin composition such that it solidifies (e.g., in the case of a thermoplastic flowable resin composition), heating the flowable resin composition such that it solidified (e.g., in the case of a thermoset flowable resin composition), or a combination thereof. The flowable resin composition can include a one or more polymers that are amorphous at standard temperature and pressure, that are crystalline at standard temperature and pressure, or a combination thereof. As used herein, the term "amorphous" as applied to a plastic or polymer refers to a plastic or polymer that has less than about 10 vol % crystalline regions, such as about 9 vol %, 8, 7, 6, 5, 4, 3, 2, 1, or about 0 vol % (e.g., an amorphous polymer need not be 100 vol % amorphous). As used herein, the term "crystalline" as applied to a plastic or polymer refers to a plastic or polymer that has more than about 10 vol % crystalline regions, such as about 10 vol % to about 80 vol %, or about 10 vol %, 15, 20, 25, 30, 35, 40, 45, 50, 55, 60, 65, 70, 75, 80, 85, 90, 95, or 100 vol % crystalline regions (e.g., a crystalline polymer need not be 100 vol % crystalline, and can be a semi-crystalline polymer).

The flowable resin composition can include at least one of an acrylonitrile butadiene styrene (ABS) polymer, an acrylic polymer, a celluloid polymer, a cellulose acetate polymer, a cycloolefin copolymer (COC), an ethylene-vinyl acetate (EVA) polymer, an ethylene vinyl alcohol (EVOH) polymer, a fluoroplastic, an ionomer, an acrylic/PVC alloy, a liquid crystal polymer (LCP), a polyacetal polymer (POM or acetal), a polyacrylate polymer, a polymethylmethacrylate polymer (PMMA), a polyacrylonitrile polymer (PAN or acrylonitrile), a polyamide polymer (PA or nylon), a polyamide-imide polymer (PAI), a polyaryletherketone polymer (PAEK), a polybutadiene polymer (PBD), a polybutylene polymer (PB), a polybutylene terephthalate polymer (PBT), a polycaprolactone polymer (PCL), a polychlorotrifluoroethylene polymer (PCTFE), a polytetrafluoroethylene polymer (PTFE), a polyethylene terephthalate polymer (PET), a polycyclohexylene dimethylene terephthalate polymer (PCT), a polycarbonate polymer (PC), a polyhydroxy alkanoate polymer (PHA), a polyketone polymer (PK), a polyester polymer, a polyethylene polymer (PE), a polyetheretherketone polymer (PEEK), a polyetherketoneketone polymer (PEKK), a polyetherketone polymer (PEK), a polyetherimide polymer (PEI), a polyethersulfone polymer (PES), a polyethylenechlorinate polymer (PEC), a polyimide polymer (PI), a polylactic acid polymer (PLA), a polymethylpentene polymer (PMP), a polyphenylene oxide polymer (PPO), a polyphenylene sulfide polymer (PPS), a polyphthalamide polymer (PPA), a polypropylene polymer, a polystyrene polymer (PS), a polysulfone polymer (PSU), a polytrimethylene terephthalate polymer (PTT), a polyurethane polymer (PU), a polyvinyl acetate polymer (PVA), a polyvinyl chloride polymer (PVC), a polyvinylidene chloride polymer (PVDC), a polyamideimide polymer (PAI), a polyarylate polymer, a polyoxymethylene polymer (POM), and a styrene-acrylonitrile polymer (SAN).

The flowable resin composition can include one or more polymers that are amorphous (e.g., that are each less than about 10 vol % crystalline when pure) at standard temperature and pressure and that are chosen from polycarbonate polymer (PC), a polyetherimide polymer (PEI), a polyphenylene oxide polymer (PPO), a polyamide (PA), a polymethylmethacrylate polymer (PMMA), a polyvinylchloride polymer (PVC), an acrylonitrile butadiene styrene polymer (ABS), a polystyrene polymer (PS), a polyethersulfone polymer (PES), a polyamideimide polymer (PAI), a polyarylate polymer, and a polysulfone (PSU). The one or more polymers that are amorphous at standard temperature and pressure can be chosen from a polycarbonate polymer (PC), a polyetherimide polymer (PEI), and a polyphenylene oxide polymer (PPO). In various embodiments, about 0.01 wt % to about 100 wt % of the flowable resin is one or more amorphous polymers (e.g., such that together the polymers have less than about 10 vol % crystallinity at standard temperature and pressure), about 40 wt % to about 100 wt %, about 50 wt % to about 100 wt %, or about 0.01 wt % or less, or about 0.1 wt %, 1, 2, 3, 4, 5, 10, 15, 20, 25, 30, 35, 40, 45, 50, 55, 60, 65, 70, 75, 80, 85, 90, 95, 96, 97, 98, 99, 99.9, or about 99.99 wt % or more.

The flowable resin composition can include one or more polymers that are crystalline (e.g., that are each more than about 10 vol % crystalline when pure, or that are about 10 vol % to about 80 vol % crystalline when pure) at standard temperature and pressure and that is chosen from a polybutylene terephthalate polymer (PBT), a polyphenylene sulfide polymer (PPS), a polyamide polymer (PA or nylon, such as nylon 6,6 or nylon 11), a polytetrafluoroethylene polymer (PTFE), a linear polyethylene polymer (PE), a polypropylene polymer (PP), a polyetherketone polymer (PEK), a polyetheretherketone polymer (PEEK), a polyetherketoneketone polymer (PEKK), a polyphthalamide polymer (PPA), and a polyoxymethylene polymer (POM). The flowable resin composition can include one or more crystalline polymers that are chosen from a polybutylene terephthalate polymer (PBT), a polyphenylene sulfide polymer (PPS), a polyamide polymer (PA or nylon), and a polyetheretherketone polymer (PEEK). In various embodiments, about 0.01 wt % to about 100 wt % of the flowable resin is one or more crystalline polymers (e.g., such that together the polymers have more than about 10 vol % crystallinity at standard temperature and pressure, such as about 10 vol % to about 80 vol %), about 40 wt % to about 100 wt %, about 50 wt % to about 100 wt %, or about 0.01 wt % or less, or about 0.1 wt %, 1, 2, 3, 4, 5, 10, 15, 20, 25, 30, 35, 40, 45, 50, 55, 60, 65, 70, 75, 80, 85, 90, 95, 96, 97, 98, 99, 99.9, or about 99.99 wt % or more.

The flowable resin composition can include a polyester. The polyester can be any suitable proportion of the flowable resin composition, such as about 0.01 wt % to about 99.9 wt % of the flowable resin composition, about 50 wt/t % to about 99.9 wt %, or about 0.01 wt/t % or less, or about 0.1 wt %, 1, 2, 3, 4, 5, 10, 15, 20, 25, 30, 35, 40, 45, 50, 55, 60, 65, 70, 75, 80, 85, 90, 95, 96, 97, 98, 99, 99.9 wt %, or about 99.99 wt % or more. The polyester can include a polybutylene terephthalate and a polyethylene terephthalate. The polybutylene terephthalate and polyethylene terephthalate can have any suitable molecular weight and viscosity. The flowable resin composition can include one type of polybutylene terephthalate or more than one type of polybutylene terephthalate. The one or more polybutylene terephthalates can form any suitable proportion of the flowable resin composition, such as about 0.01 wt % to about 99.9 wt % of the flowable resin composition, about 50 wt % to about 99.9 wt %, or about 0.01 wt % or less, or about 0.1 wt %, 1, 2, 3, 4, 5, 10, 15, 20, 25, 30, 35, 40, 45, 50, 55, 60, 65, 70, 75, 80, 85, 90, 95, 96, 97, 98, 99, 99.9 wt %, or about 99.99 wt % or more. The flowable resin composition can include one type of polyethylene terephthalate or more than one type of polyethylene terephthalate. The one or more polyethylene terephthalates can form any suitable proportion of the flowable resin composition, such as about such as about 0.01 wt % to about 99.9 wt % of the flowable resin composition, about 50 wt % to about 99.9 wt %, or about 0.01 wt % or less, or about 0.1 wt %, 1, 2, 3, 4, 5, 10, 15, 20, 25, 30, 35, 40, 45, 50, 55, 60, 65, 70, 75, 80, 85, 90, 95, 96, 97, 98, 99, 99.9 wt %, or about 99.99 wt % or more. The one or more polyethylene terephthalates can be greater than 30 wt % of the flowable resin composition, such as greater than 31 wt %, 32, 33, 34, 35, 36, 37, 38, 39, 40, 42, 44, 46, 48, or greater than 50 wt %, or greater than 30 wt % and less than or equal to about 99 wt % of the flowable resin composition, or greater than 30 wt % and less than or equal to about 80 wt %, or greater than 30 wt % and less than or equal to about 50 wt %, or greater than 30 wt % and less than or equal to about 40 wt %, or about 32 wt % to about 99 wt %. The combination of the one or more polybutylene terephthalates and the one or more polyethylene terephthalate can form any suitable proportion of the flowable resin composition, such as about 0.1 wt %, 1, 2, 3, 4, 5, 10, 15, 20, 25, 30, 35, 40, 45, 50, 55, 60, 65, 70, 75, 80, 85, 90, 95, 96, 97, 98, 99, 99.9 wt %, or about 99.99 wt % or more. The weight ratio of the one or more polybutylene terephthalates to the one or more polyethylene terephthalates can be any suitable weight ratio, such as about 100:1 to about 1:100, about 9:1 to about 1:9, about 7:3 to about 3:7, about 1:1, or about 100:1 or more, or about 9:1, 8.5:1.5, 8:2, 7.5:2.5, 7:3, 6.5:3.5, 6:4, 5.5:4.5, 5:5, 4.5:5.5, 4:6, 3.5:6.5, 3:7, 2.5:7.5, 2:8, 1.5:8.5, 1:9, or about 1:100 or less. In addition to the polybutylene terephthalate and the polyethylene terephthalate, the flowable resin composition can include any other suitable material, such as any one or more polymers described herein, and such as any suitable one or more additives, such as any additive described herein.

The polyethylene terephthalate can include more than one type of polyethylene terephthalate polymer, such as at least two polyethylene terephthalate polymers each having a different viscosity, such as a different intrinsic viscosity. The polybutylene terephthalate can include more than one type of polybutylene terephthalate polymer, such as at least two polybutylene terephthalate polymers each having a different viscosity, such as a different intrinsic viscosity. For example, each polyethylene terephthalate polymer and each polybutylene terephthalate polymer can independently have an intrinsic viscosity (e.g., at room temperature, measured in a 60:40 phenol/tetrachloroethane mixture) of about 0.01 deciliter per gram (dL/g) to about 10 dL/g, or about 0.2 dL/g to about 5 dL/g, or about 0.5 dL/g to about 1.5 dL/g, or about 0.01 dug or less, or about 0.1 dL/g, 0.2, 0.3, 0.4, 0.5, 0.6, 0.7, 0.8, 0.9, 1.0, 1.1, 1.2, 1.3, 1.4, 1.5, 1.6, 1.8, 2.0, 2.5, 3, 4, 5, 6, 7, 8, 9, or about 10 dL/g or more. The difference in viscosity between the at least two polyethylene terephthalate polymers having different viscosities, or between the at least two polybutylene terephthalate polymers having different viscosities, can be any suitable difference, such as (e.g., at room temperature, measured in a 60:40 phenol/tetrachloroethane mixture) about 0.01 dL/g to about 10 dL/g, or about 0.05 dL/g to about 2 dL/g, or about 0.2 dL/g to about 0.8 dL/g, or about 0.01 dL/g or less, or equal to or greater than about 0.0 dL/g, 0.04, 0.06, 0.08, 0.1, 0.12, 0.14, 0.16, 0.18, 0.2, 0.22, 0.24, 0.26, 0.28, 0.3, 0.32, 0.34, 0.36, 0.38, 0.4, 0.42, 0.44, 0.46, 0.48, 0.50, 0.52, 0.54, 0.56, 0.58, 0.6, 0.65, 0.7, 0.75, 0.8, 0.85, 0.9, 1, 1.5, 2, 3, 4, 5, 6, 7, 8, 9, or about 10 dL/g or more. The one of the at least two polyethylene terephthalate polymers having different viscosities that has the highest viscosity, or of the one of the at least two polybutylene terephthalate polymers having the highest viscosity, can have any suitable weight ratio to the one of the at least two polyethylene terephthalate polymers having different viscosities that has the lowest viscosity, or of the one of the at least two polybutylene terephthalate polymers having the lowest viscosity, respectively, such as about 100:1 to about 1:100, about 9:1 to about 1:9, about 7:3 to about 3:7, about 1:1, or about 100:1 or more, or about 9:1, 8.5:1.5, 8:2, 7.5:2.5, 7:3, 6.5:3.5, 6:4, 5.5:4.5, 5:5, 4.5:5.5, 4:6, 3.5:6.5, 3:7, 2.5:7.5, 2:8, 1.5:8.5, 1:9, or about 1:100 or less.

The flowable resin composition can include a filler, such as one filler or multiple fillers. The filler can be any suitable type of filler. The filler can be homogeneously distributed in the flowable resin composition. The one or more fillers can form about 0.001 wt % to about 50 wt % of the flowable resin composition, or about 0.01 wt % to about 30 wt %, or about 0.001 wt % or less, or about 0.01 wt %, 0.1, 1, 2, 3, 4, 5, 10, 15, 20, 25, 30, 35, 40, 45 wt %, or about 50 wt % or more. The filler can be fibrous or particulate. The filler can be aluminum silicate (mullite), synthetic calcium silicate, zirconium silicate, fused silica, crystalline silica graphite, natural silica sand, or the like; boron powders such as boron-nitride powder, boron-silicate powders, or the like; oxides such as $TiO_2$, aluminum oxide, magnesium oxide, or the like; calcium sulfate (as its anhydride, dehydrate or trihydrate); calcium carbonates such as chalk, limestone, marble, synthetic precipitated calcium carbonates, or the like; talc, including fibrous, modular, needle shaped, lamellar talc, or the like; wollastonite; surface-treated wollastonite; glass spheres such as hollow and solid glass spheres, silicate spheres, cenospheres, aluminosilicate (armospheres), or the like; kaolin, including hard kaolin, soft kaolin, calcined kaolin, kaolin including various coatings known in the art to facilitate compatibility with the polymeric matrix resin, or the like; single crystal fibers or "whiskers" such as silicon carbide, alumina, boron carbide, iron, nickel, copper, or the like; fibers (including continuous and chopped fibers) such as asbestos, carbon fibers, glass fibers; sulfides such as molybdenum sulfide, zinc sulfide, or the like; barium compounds such as barium titanate, barium ferrite, barium sulfate, heavy spar, or the like; metals and metal oxides such as particulate or fibrous aluminum, bronze, zinc, copper and nickel, or the like; flaked fillers such as glass flakes, flaked silicon carbide, aluminum diboride, aluminum flakes, steel flakes or the like; fibrous fillers, for example short inorganic fibers such as those derived from blends including at least one of aluminum silicates, aluminum oxides, magnesium oxides, and calcium sulfate hemihydrate or the like; natural fillers and reinforcements, such as wood flour obtained by pulverizing wood, fibrous products such as kenaf, cellulose, cotton, sisal, jute, flax, starch, corn flour, lignin, ramie, rattan, agave, bamboo, hemp, ground nut shells, corn, coconut (coir), rice grain husks or the like; organic fillers such as polytetrafluoroethylene, reinforcing organic fibrous fillers formed from organic polymers capable of forming fibers such as poly (ether ketone), polyimide, polybenzoxazole, poly(phenylene sulfide), polyesters, polyethylene, aromatic polyamides, aromatic polyimides, polyetherimides, polytetrafluoroethylene, acrylic resins, poly(vinyl alcohol) or the like; as well as additional fillers such as mica, clay, feldspar, flue dust, fillite, quartz, quartzite, perlite, Tripoli, diatomaceous earth, carbon black, or the like, or combinations including at least one of the foregoing fillers. The filler can be talc, glass fiber, kenaf fiber, or combinations thereof. The filler can be coated with a layer of metallic material to facilitate conductivity, or surface treated with silanes, siloxanes, or a combination of silanes and siloxanes to improved adhesion and dispersion with the flowable resin composition. The filler can be selected from glass fibers, carbon fibers, a mineral fillers, or combinations thereof. The filler can be is selected from mica, talc, clay, wollastonite, zinc sulfide, zinc oxide, carbon fibers, glass fibers ceramic-coated graphite, titanium dioxide, or combinations thereof. The filler can be glass fiber.

The flowable resin composition can further include one or more polyolefins, such as a polyethylene, a polyacrylate, a polyacrylamide, a polyvinylchloride, a polystyrene, or another polyolefin. The polyolefin can be any suitable polyolefin. The one or more polyolefins can form any suitable proportion of the flowable resin composition, such as about 0.001 wt % to about 50 wt % of the flowable resin composition, or about 0.01 wt % to about 30 wt %, or about 0.001 wt % or less, or about 0.01 wt %, 0.1, 1, 2, 3, 4, 5, 10, 15, 20, 25, 30, 35, 40, 45 wt %, or about 50 wt % or more.

The flowable resin composition can further include one or more polyesters, such as aromatic polyesters, poly(alkylene esters) including poly(alkylene arylates) (e.g., poly(alkylene terephthalates)), and poly(cycloalkylene diesters) (e.g., poly (cycloghexanedimethylene terephthalate) (PCT), or poly(1, 4-cyclohexane-dimethanol-1,4-cyclohexanedicarboxylate) (PCCD)), and resourcinol-based aryl polyesters. The polyester can be poly(isophthalate-terephthalate-resorcinol)esters, poly(isophthalate-terephthalate-bisphenol A)esters, poly[(isophthalate-terephthalate-resorcinol)ester-co-(isophthalate-terephthalate-bisphenol A)]ester, or a combination including at least one of these. Examples of poly(alkylene terephthalates) include poly(ethylene terephthalate) (PET), poly(1,4-butylene terephthalate) (PBT), and poly(propylene terephthalate) (PPT). Also useful are poly(alkylene naphthoates), such as poly(ethylene naphthanoate) (PEN), and poly(butylene naphthanoate) (PBN). Copolymers including alkylene terephthalate repeating ester units with other ester groups can also be useful. Useful ester units can include different alkylene terephthalate units, which can be present in the polymer chain as individual units, or as blocks of poly(alkylene terephthalates). Specific examples of such copolymers include poly(cyclohexanedimethylene terephthalate)-co-poly(ethylene terephthalate), abbreviated as PETG where the polymer includes greater than or equal to 50 mol % of poly(ethylene terephthalate), and abbreviated as PCTG where the polymer includes greater than 50 mol % of poly(1,4-cyclohexanedimethylene terephthalate). The one or more polyesters can form any suitable proportion of the flowable resin composition, such as about 0.001 wt % to about 50 wt % of the flowable resin composition, or about 0.01 wt % to about 30 wt %, or about 0.001 wt % or less, or about 0.01 wt %, 0.1, 1, 2, 3, 4, 5, 10, 15, 20, 25, 30, 35, 40, 45 wt %, or about 50 wt % or more.

In various embodiments, the present invention provides a junction between a metal form and a solid plastic. The junction can be any suitable junction between a metal form and a solid plastic that can be formed using an embodiment of the method for forming a junction between a metal form and a solid plastic described herein.

For example, the junction can include a metal form including a plurality of pores. The junction can include a solid plastic including a polybutylene terephthalate and a polyethylene terephthalate. The solid plastic can include a plurality of anchors, with each anchor extending into one of the pores. The polybutylene terephthalate and the polyethylene terephthalate together can be about 30 wt % to about 90 wt % of the solid plastic. The solid plastic has a weight ratio of the polybutylene terephthalate to the polyethylene terephthalate of about 7:3 to about 1:9.

For example, the junction can include a metal form including a roughened surface and a solid plastic. The roughened surface can include a plurality of surface structures each having at least one dimension approximately parallel to the metal surface of about 1 nm to about 1 mm. The surface structures can include convex surface structures, concave surface structures, or a combination thereof. About 40 wt % to about 100 wt % of the solid plastic can be one or more polymers that are amorphous at standard temperature and pressure. The solid plastic can include a plurality of anchors, each anchor extending substantially to a bottom of a concave surface structure or substantially to a bottom of a cavity formed between multiple convex surface structures (e.g., a mechanical interlock between the solid plastic and the metal, wherein each anchor substantially fills each cavity or concave surface structure, such as fills about 50 vol % to about 100 vol % of the cavities or concave surface structure, such as the average vol % of all filled concave structures or all filled cavities, or about 90-100 vol %, or about 50 vol % or less, or about 55 vol %, 60, 65, 70, 75, 80, 82, 84, 86, 88, 90, 92, 94, 95, 96, 97, 98, 99, 99.9, or about 99.99 vol % or more).

EXAMPLES

Various embodiments can be better understood by reference to the following non-limiting Examples which are offered by way of illustration

Example 1.1. Formation of Resin Composition

A resin composition was formed having the composition shown in Table 1. Viscosity was measured in a 60:40 phenol/tetrachloroethane mixture at room temperature. The resin composition had a 1:1 weight ratio of polybutylene terephthalate to polyethylene terephthalate.

TABLE 1

| Resin composition. | | |
| --- | --- | --- |
| Contents of resin composition | Viscosity (dL/g, 25° C.) | Wt % |
| polybutylene terephthalate | 0.74 | 26.6 |
| polybutylene terephthalate | 1.27 | 8 |
| polyethylene terephthalate | 0.84 | 20 |
| polyethylene terephthalate | 0.56 | 14.6 |
| glass fiber | — | 30 |
| stabilizers/additives | | 0.8 |

Example 1.2. Tensile Shear Bonding Strength Testing

A porous aluminum form of grade AL6013 and size 18 mm×45 mm×1.6 mm was prepared using Treatment A or using Treatment B.

In Treatment A, the form was cleaned and degreased. Then, the form was chemically etched using alternating acid and alkali treatments, to form irregularly shaped holes having an approximate size of 1-100 micrometers. Then, the form was cleaned and dried.

In Treatment B, 2-(dioctylamino)-1,3,5-triazine-4,6-dithiol monosodium salt) (DON) was electrochemically polymerized on the form. The electrolytic cell was equipped with a working electrode (the form), counter electrode (Pt plate), and reference electrode (saturated calomel electrode) and filled with electrolytic solution containing DON and $Na_2CO_3$ in water. The electrochemically polymerized surface on the form was porous (e.g., a porous adhesion film, or a porous coating formed via chemical reaction with the metal), with generally 20 nm-40 nm sized pores.

Figure 9A:
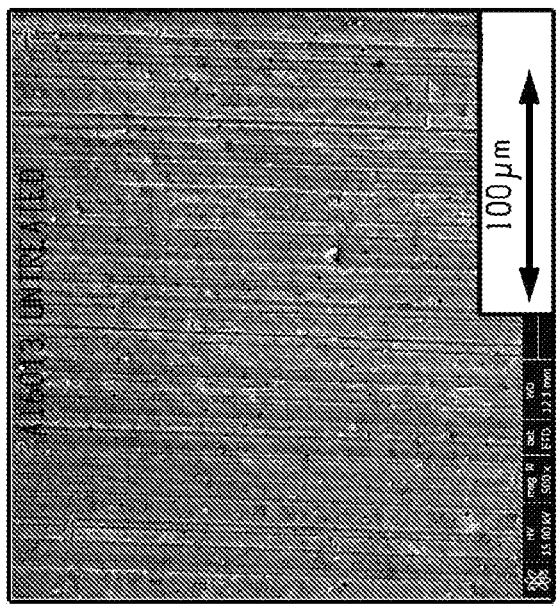
FIGS. 9A-I illustrate a metal form before (A) and after (B-I) a treatment to form pores therein, in accordance with various embodiments.
Figure 9B:
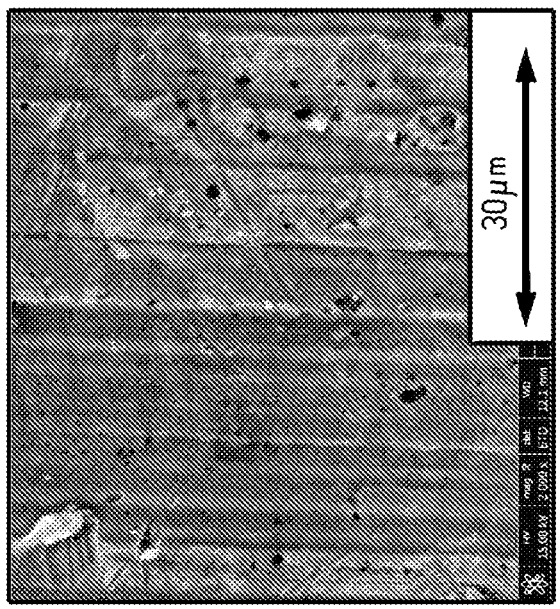
Figure 9C:
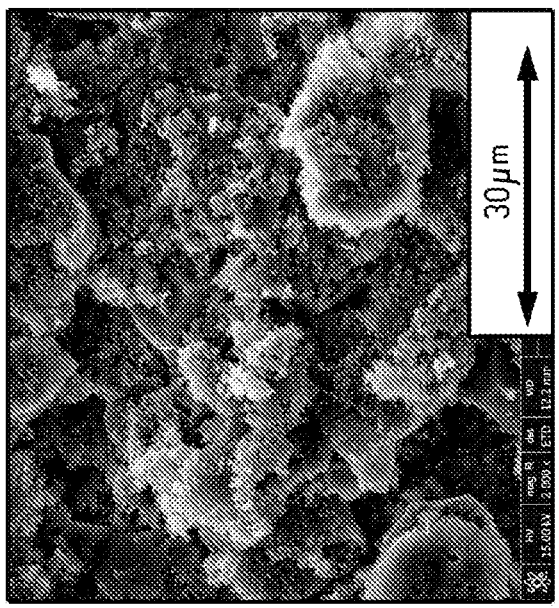
Figure 9D:
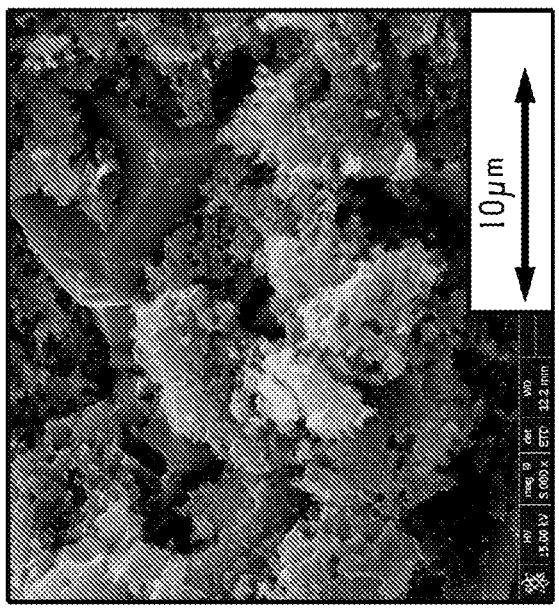
Figure 9F:
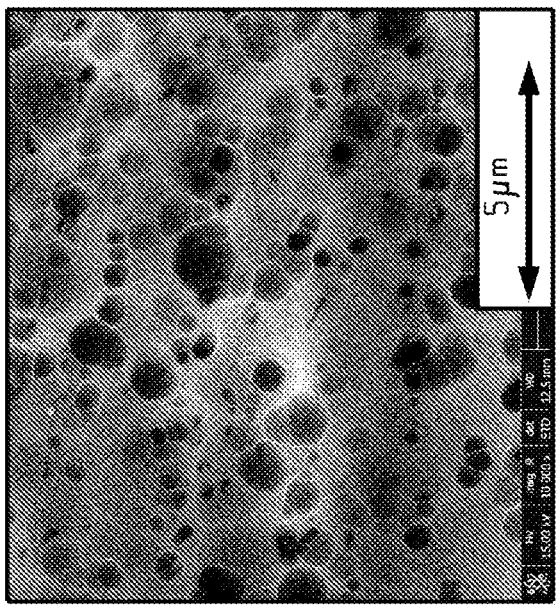
Figure 9H:
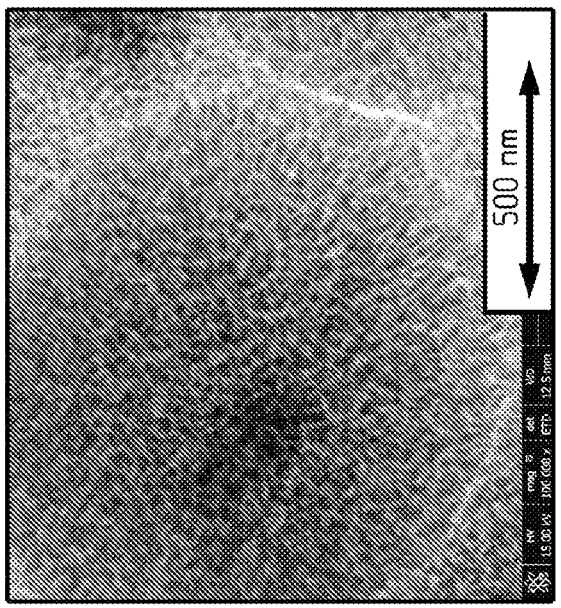
Figure 9E:
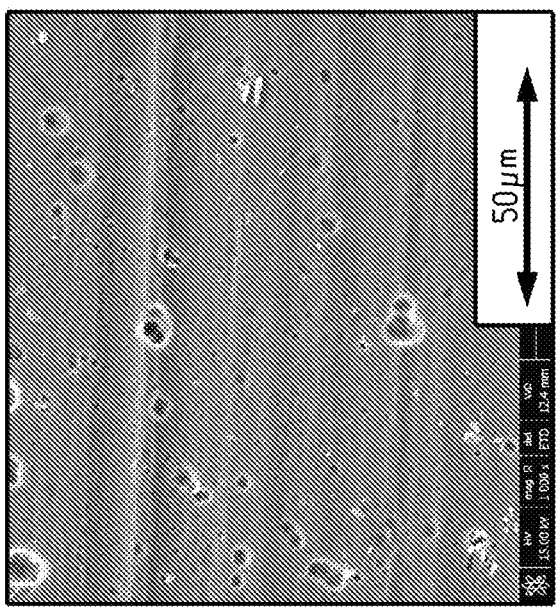
Figure 9G:
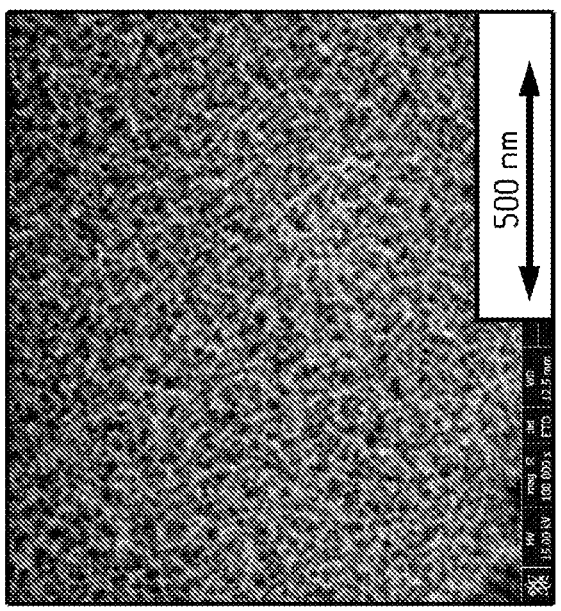
Figure 9I:
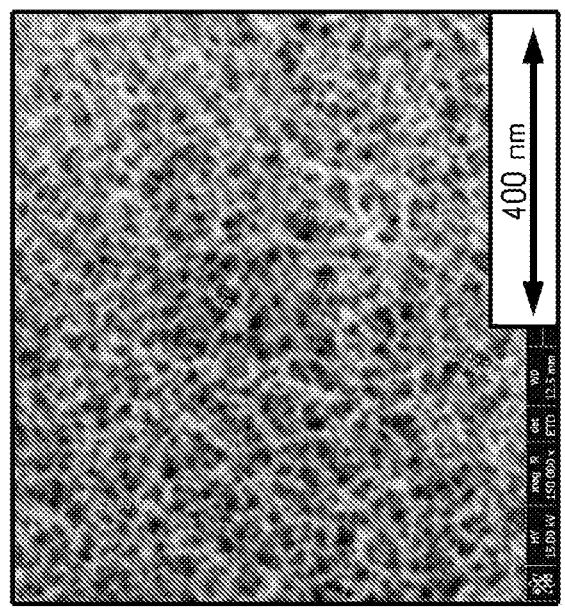

FIG. 9A illustrates the untreated form. FIGS. 9B-D illustrate the form treated using Treatment A. FIGS. 9E-I illustrate the form treated using Treatment B.

Figure 10A:
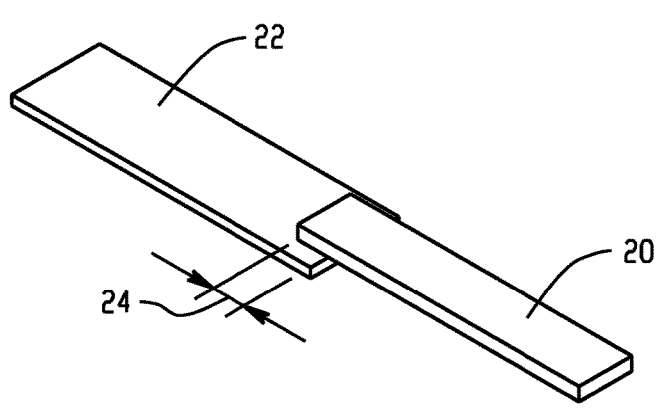
FIG. 10A illustrates a porous steel form with an injection molded plastic thereon, in accordance with various embodiments.

The resin composition (20) of Example 1.1 was injection molded to form a solid plastic form of 10 mm×45 mm×3 mm on each of the porous steel forms (22) over an bonding area (24) of 10 mm×5 mm (i.e., 0.5 cm$^2$), as shown in FIG. 10A. A melt temperature of 270° C. was used. A mold temperature of 125° C. was used. A packing pressure of 1,600 kilograms force per square centimeter (kgf/cm$^2$) for 3 seconds was used.

Using each of the two types of metal forms prepared, the injection molding procedure was repeated using a polybutylene terephthalate ("PBT A") and another polybutylene terephthalate ("PBT B"). PBT A was polybutylene terephthalate comprising 40 wt % glass fibers. PBT B was polybutylene terephthalate.

Figure 10B:
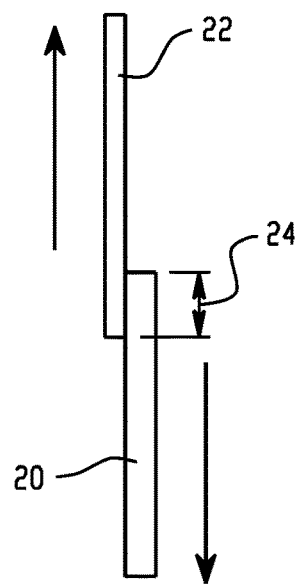
FIG. 10B illustrates tensile shear bonding strength testing, in accordance with various embodiments.
Figure 11:
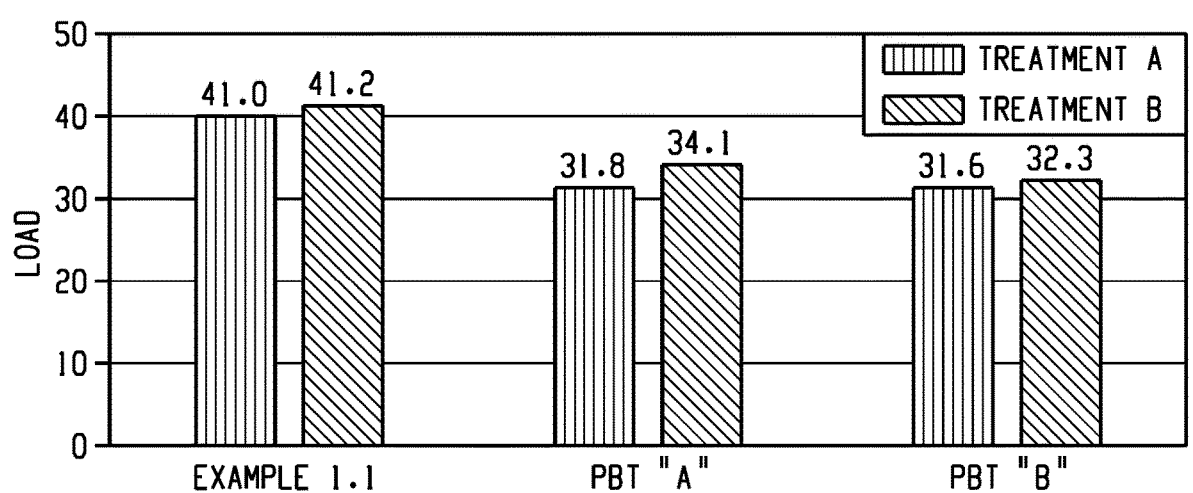
FIG. 11 illustrates tensile shear bonding strength result in MegaPascals for various metal treatments and for various resin compositions, in accordance with various embodiments.

A tensile shear bonding strength test was performed on the six samples, based on ISO19095. A Shimadze AG-IS was used, with a 10 kiloNewton (kN) load cell, a tensile speed of 10 mm/min, a temperature of 23° C., at a relative humidity of 50%. The direction of the applied shear was parallel to the bonded surface, as shown by the arrows in FIG. 10B. The results are illustrated in FIG. 11.

The resin composition of Example 1.1 showed greater tensile bonding strength compared with other PBT resins. The two different metal preparation techniques had the same trend.

Figure 12:
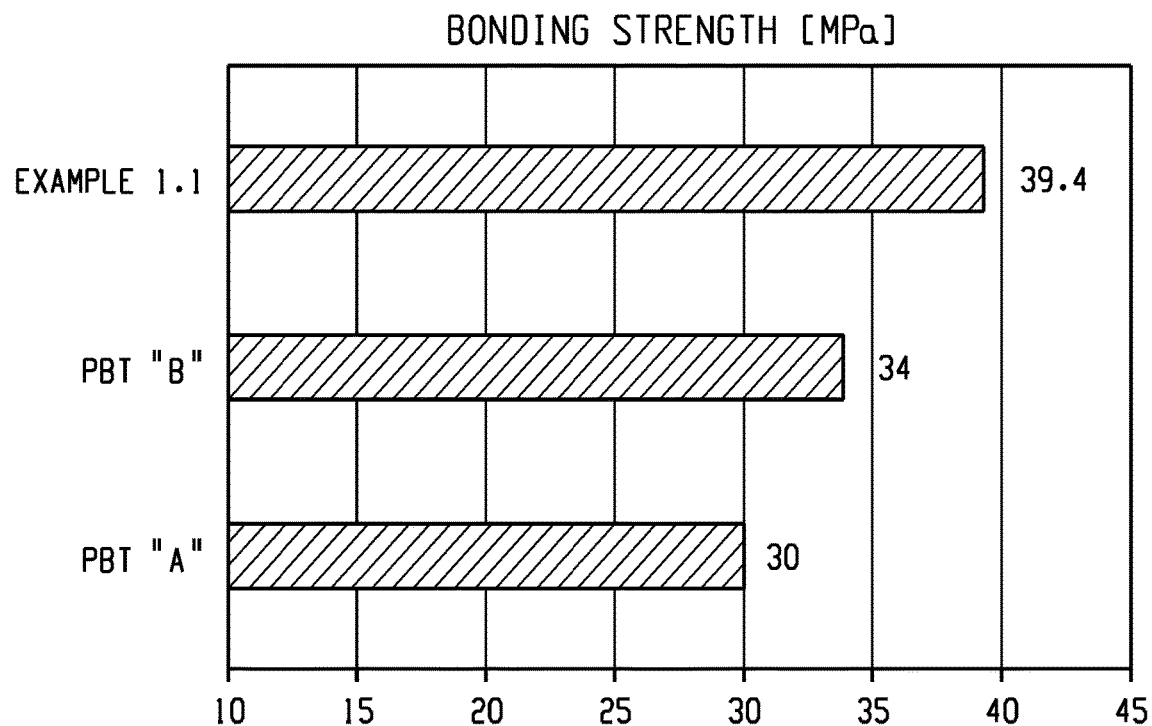
FIG. 12 illustrates bonding strength of various plastic-metal junctions, in accordance with various embodiments.

The experiment was repeated using the porous metal form prepared with Treatment A, using the resin composition of Example 1.1, PBT A. and PBT B. The tensile bonding strength test was repeated, with results illustrated in FIG. 12 in MPa. The resin composition of Example 1 showed greater tensile bonding strength compared with other PBT resins.

Figure 13:
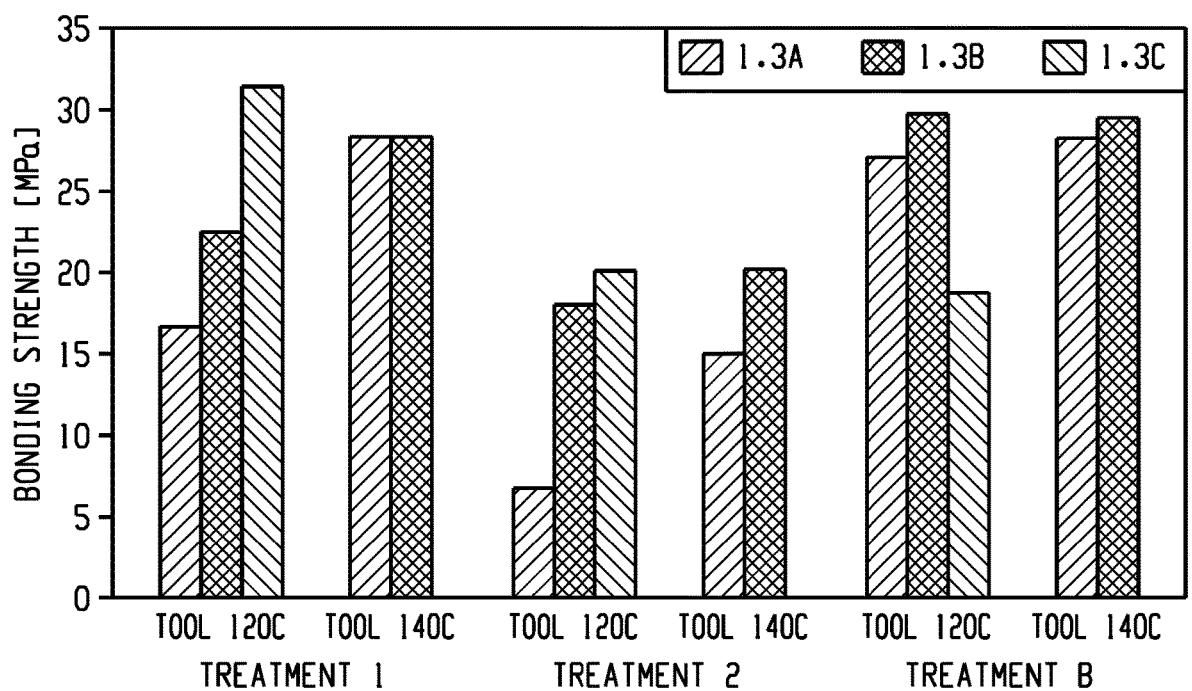
FIG. 13 illustrates the bonding strength of various metals with various resin compositions under various conditions, in accordance with various embodiments.

Example 1.3. Preparation and Tensile Shear Bonding Strength Testing Using Other Metal Preparation Techniques The procedure of Example 1.2 was repeated using a metal forms prepared using Treatment 1 (a metal etching technology chemical etching treatment similar to Treatment A but providing nano-sized pores (e.g., about 1 nm to about 100 nm), Treatment 2 (a metal etching technology providing micro-sized pores, a chemical etching treatment similar to Treatment A), and Treatment B. Samples 1.3A (PBT with PBT:PET molar ratio of 8:2 and 30 wt % glass fibers), 1.3B (PBT with 15 wt % PET, 10 wt % polycarbonate, and 30 wt %° glass fibers), and 1.3C (PBT with 40 wt % glass fibers) were used. A mold temperature of 120° C. or 140° C. was used. The results are shown in FIG. 13.

Example 2.1. Polycarbonate (PC) Resin with Chemical- and Laser-Etched Aluminum Plate An aluminum plate (A5052), having dimensions of 1.5 mm×50 mm×18 mm, was dipped for 10 minutes in 1 liter of acetone while being subjected to ultrasonic waves, followed by washing with tap water.

Next, 2 liters of hydrochloric acid diluted with ion-exchanged water to a concentration of 1% was put into a large-sized beaker kept at 40° C. The above-described aluminum alloy pieces were successively dipped in the diluted hydrochloric acid for 1 minute by being stood against the glass wall of the beaker in such a manner as not to contact each other, followed by washing with running tap water. Subsequently, the aluminum alloy pieces were similarly dipped for 1 minute in 2 liters of aqueous caustic soda solution diluted with ion-exchange water to a concentration of 1%, followed by washing with tap water. Subsequently, the aluminum alloy pieces were similarly dipped for 1 minute in 2 liters of hydrochloric acid diluted with ion-exchange water to a concentration of 1%. Then, the aluminum alloy pieces were successively dip-washed in three beakers each filled with 2 liters of ion-exchange water.

Figure 14:
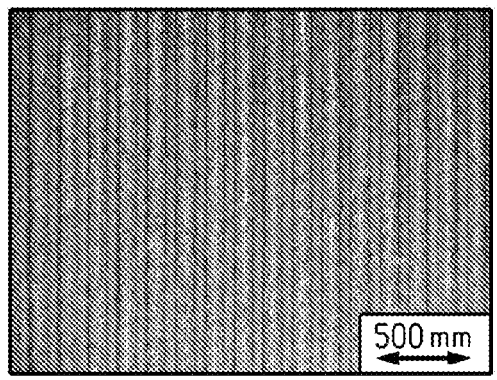
FIGS. 14-16 illustrate scanning electron microscope images of various aluminum surfaces, in accordance with various embodiments.

Next, 2 liters of ion-exchange water solution containing 5% hydrazine monohydrate was prepared, and the above-described aluminum alloy pieces were successively dipped therein for 2 minutes at 50° C. Then, the aluminum alloy pieces were successively dip-washed in three beakers each filled with 2 liters of ion-exchange water, followed by force-drying with warm air at 50° C. for 10 to 20 minutes. The dried aluminum alloy pieces were put in a storage box filled with dry air. A scanning electron microscope image of the aluminum plate is illustrated in FIG. 14.

Figure 15:
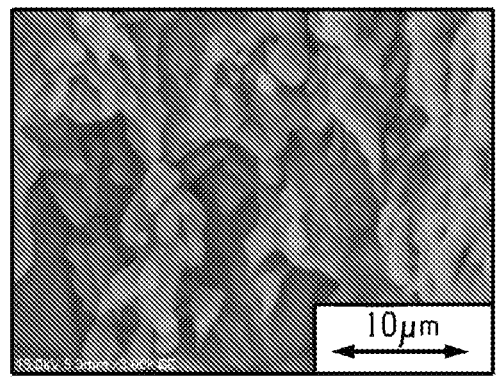

Another aluminum plate of the same alloy was subjected to laser etching, using a 50 W Nd-YAG laser having a frequency of 1064 nm, a scan speed of 100 mm/sec, and a beam diameter of 50 micrometers. A scanning electron microscope image of the aluminum plate is illustrated in FIG. 15. The etched plate had stripes having a width of 50 micrometers, a depth of 50 micrometers, and a distance between each stripe of 150 micrometers.

Using a Sumitomo heavy industry SE100EV injection molding machine, a polycarbonate resin was injection molded to contact the aluminum plates. The polycarbonate had a glass transition temperature of 130° C. (measured by DSC), a melt flow rate 18 cubic centimeters per to minutes (cm$^3$/10 min) at 300° C./5 kilograms (kg), and had a glass fiber content of 50 wt %. The injected resin had a temperature of 300° C. The aluminum was heated to a temperature of 100, 120, 140, or 150° C. at the time of the injection molding by heating the mold which heated the aluminum insert, as illustrated in FIG. 4, and then passively allowed to cool to 90° C. The final size of the injection molded resin was 3 mm×45 mm×10 mm. The aluminum plate and the injection molded resin had a bonding area of 50 mm$^2$.

A tensile shear bonding strength test was performed on the six samples, based on ISO19095. A Shimadze AG-IS was used, with a 10 kN load cell, a tensile speed of 10 mm/min, a temperature of 23° C., at a relative humidity of 50%. The direction of the applied shear was parallel to the bonded surface, as shown in FIG. 10B. The test results are shown in Table 2.

TABLE 2

Polycarbonate/aluminum plate tensile shear bonding strength.

| | Bonding strength (MPa) | |
| --- | --- | --- |
| Insert metal temperature | Laser etched aluminum plate | Chemically etched aluminum plate |
| 100° C. | 6 | 0 |
| 120° C. | 8 | 7 |
| 140° C. | 16 | 18 |
| 150° C. | 25 | 28 |

Example 2.2. Polyetherimide (PEI) with Chemical-Etched Aluminum Plate

Figure 16:
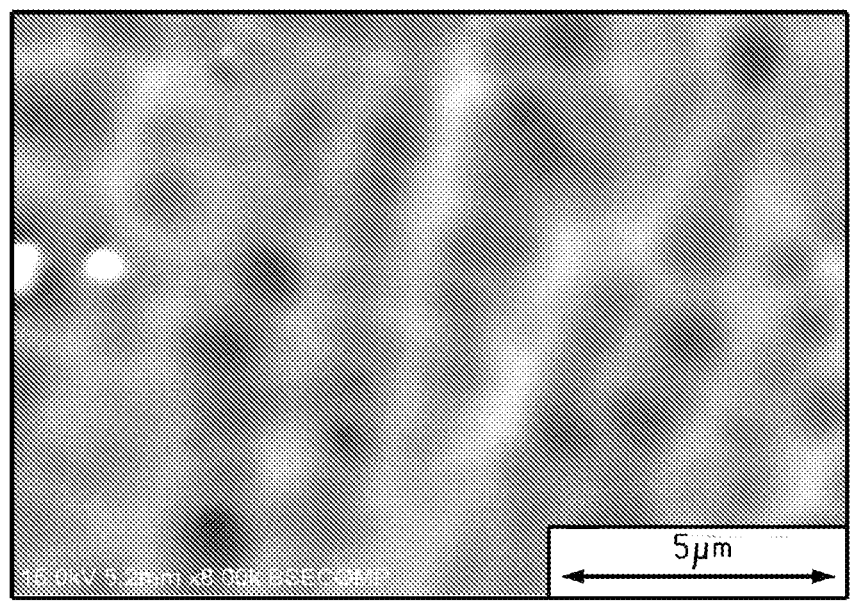

An aluminum plate (A5052), having dimensions of 1.5 mm×50 mm×18 mm, was chemically etched using the procedure described in Example 2.1. A scanning microscope image of the aluminum plate is shown in FIG. 16.

Using a Sumitomo heavy industry SE100EV injection molding machine, a polyetherimide resin was injection molded to contact the aluminum plates. The polyetherimide had a glass transition temperature of 217° C. (as measured by DSC), and a melt flow rate 18 cm$^3$/10 min at 337° C./6.6 kg. The injected resin had a temperature of 380PC. Using an electric heater/cooler, the aluminum was heated to a temperature of 230, 260, or 290° C. using a heater embedded in the mold at the time of the injection molding, as illustrated in FIG. 5, and then after the injection of the liquid resin, the aluminum was actively cooled to 180° C. The final size of the injection molded resin was 3 mm×45 mm×10 mm. The aluminum plate and the injection molded resin had a bonding area of 50 mm$^2$.

A tensile shear bonding strength test was performed on the six samples, based on ISO19095. A Shimadze AG-IS was used, with a 10 kN load cell, a tensile speed of 10 mm/min, a temperature of 23° C., at a relative humidity of 50%. The direction of the applied shear was parallel to the bonded surface, as shown in FIG. 10B. The test results are shown in Table 3.

TABLE 3

Polyetherimide/aluminum plate tensile shear bonding strength

| Insert metal temperature | Bonding strength (MPa) Chemical etched Aluminum plate |
|---|---|
| 230° C. | 0 |
| 260° C. | 10 |
| 290° C. | 28 |

Example 2.3. Polycarbonate (PC) Resin with Chemical- and Laser-Etched Aluminum Plate An aluminum plate (A5052), having dimensions of 1.5 mm×50 mm×18 mm, was chemically etched using the procedure described in Example 2.1. A scanning microscope image of the aluminum plate is shown in FIG. 16.

Another aluminum plate of the same alloy was subjected to laser etching, using a 50 W Nd-YAG laser having a frequency of 1064 nm, a scan speed of 100 mm/sec, and a beam diameter of 50 micrometers. A scanning electron microscope image of the aluminum plate is illustrated in FIG. 15. The etched plate had stripes having a width of 50 micrometers, a depth of 50 micrometers, and a distance between each stripe of 150 micrometers.

Using a Sumitomo heavy industry SE100EV injection molding machine, a polycarbonate resin was injection molded to contact the aluminum plates. The polycarbonate had a glass transition temperature of 150° C. (measured by DSC), a melt flow rate 3 g/10 min at 300° C./1.2 kg, and had a glass fiber content of 30 wt %. The injected resin had a temperature of 300° C. Using an electric heater/cooler, the aluminum was heated to a temperature of 130, 150, 180, 220 or 250° C. at the time of the injection molding by heating the mold which heated the aluminum insert, as illustrated in FIG. 5. After the injection of the melted resin, the aluminum was actively cooled to 120° C. The final size of the injection molded resin was 3 mm×45 mm×10 mm. The aluminum plate and the injection molded resin had a bonding area of 50 mm$^2$.

A tensile shear bonding strength test was performed on the six samples, based on ISO19095. A Shimadze AG-IS was used, with a 10 kN load cell, a tensile speed of 10 mm/min, a temperature of 23° C., at a relative humidity of 50%. The direction of the applied shear was parallel to the bonded surface, as shown in FIG. 10B. The test results are shown in Table 4.

TABLE 4

Polycarbonate/aluminum plate tensile shear bonding strength.

| Insert metal temperature | Bonding strength (MPa) | |
|---|---|---|
| | Laser etched aluminum plate | Chemically etched aluminum plate |
| 130° C. | 0 | 0 |
| 150° C. | 9 | 0 |
| 180° C. | 37 | 2 |
| 220° C. | 42 | 16 |
| 250° C. | 45 | 27 |

Example 2.4. Polycarbonate Copolymer (PC-Copolymer) Resin with Chemical- and Laser-Etched Aluminum Plate An aluminum plate (A5052), having dimensions of 1.5 mm×50 mm×18 mm, was chemically etched using the procedure described in Example 2.1. A scanning microscope image of the aluminum plate is shown in FIG. 16.

Another aluminum plate of the same alloy was subjected to laser etching, using a 50 W Nd-YAG laser having a frequency of 1064 nm, a scan speed of 100 mm/sec, and a beam diameter of 50 micrometers. A scanning electron microscope image of the aluminum plate is illustrated in FIG. 15. The etched plate had stripes having a width of 50 micrometers, a depth of 50 micrometers, and a distance between each stripe of 150 micrometers.

Using a Sumitomo heavy industry SE100EV injection molding machine, a polycarbonate copolymer resin was injection molded to contact the aluminum plates. The polycarbonate copolymer had a glass transition temperature of 190° C. (measured by DSC), a melt flow rate 25 g/10 min at 330° C./2.16 kg, and had a glass fiber content of 30 wt %. The injected resin had a temperature of 300° C. Using an electric heater/cooler, the aluminum was heated to a temperature of 180, 220, 240, or 260° C. at the time of the injection molding by heating the mold which heated the aluminum insert, as illustrated in FIG. 5. After the injection of the melted resin, the aluminum was actively cooled to 140° C. The final size of the injection molded resin was 3 mm×45 mm×10 mm. The aluminum plate and the injection molded resin had a bonding area of 50 mm$^2$.

A tensile shear bonding strength test was performed on the six samples, based on ISO19095. A Shimadzu AG-IS was used, with a 10 kN load cell, a tensile speed of 10 mm/min, a temperature of 23° C., at a relative humidity of 50%. The direction of the applied shear was parallel to the bonded surface, as shown in FIG. 10B. The test results are shown in Table 5.

TABLE 5

Polycarbonate copolymer/aluminum plate tensile shear bonding strength.

| | Bonding strength (MPa) | |
|---|---|---|
| Insert metal temperature | Laser etched aluminum plate | Chemically etched aluminum plate |
| 180° C. | 0 | 0 |
| 220° C. | 31 | 0 |
| 240° C. | 33 | 2.9 |
| 260° C. | 31 | 5.5 |

Example 2.5 Polyphenylene Oxide (PPO)/Polystyrene (PS) Blend Resin with Chemical- and Laser-Etched Aluminum Plate An aluminum plate (A5052), having dimensions of 1.5 mm×50 mm×18 mm, was chemically etched using the procedure described in Example 2.1. A scanning microscope image of the aluminum plate is shown in FIG. 16.

Another aluminum plate of the same alloy was subjected to laser etching, using a 50 W Nd-YAG laser having a frequency of 1064 nm, a scan speed of 100 mm/sec, and a beam diameter of 50 micrometers. A scanning electron microscope image of the aluminum plate is illustrated in FIG. 15. The etched plate had stripes having a width of 50 micrometers, a depth of 50 micrometers, and a distance between each stripe of 150 micrometers Using a Sumitomo heavy industry SE100EV injection molding machine, a PPO/PS resin was injection molded to contact the aluminum plates. The PPO/PS had a glass transition temperature of 150° C. (measured by DSC), a melt flow rate 8.4 g/10 min at 300° C./5 kg, and had a glass fiber content of 30 wt %. The injected resin had a temperature of 300° C. Using an electric heater/cooler, the aluminum was heated to a temperature of 130, 150, 180, or 220° C. at the time of the injection molding by heating the mold which heated the aluminum insert, as illustrated in FIG. 5. After the injection of the melted resin, the aluminum was actively cooled to 120° C. The final size of the injection molded resin was 3 mm×45 mm×10 mm. The aluminum plate and the injection molded resin had a bonding area of 50 mm².

A tensile shear bonding strength test was performed on the six samples, based on ISO 19095. A Shimadzu AG-IS was used, with a 10 kN load cell, a tensile speed of 10 mm/min, a temperature of 23° C., at a relative humidity of 50%. The direction of the applied shear was parallel to the bonded surface, as shown in FIG. 10B. The test results are shown in Table 6.

TABLE 6

PPO/PS/aluminum plate tensile shear bonding strength.

| | Bonding strength (MPa) | |
|---|---|---|
| Insert metal temperature | Laser etched aluminum plate | Chemically etched aluminum plate |
| 130° C. | 0 | 0 |
| 150° C. | 15 | 0 |
| 180° C. | 34 | 3 |
| 220° C. | 41 | 36 |

Example 2.6. Polyether Imide (PEI) Resin with Chemical- and Laser-Etched Aluminum Plate An aluminum plate (A5052), having dimensions of 1.5 mm×50 mm×18 mm, was chemically etched using the procedure described in Example 2.1. A scanning microscope image of the aluminum plate is shown in FIG. 16.

Another aluminum plate of the same alloy was subjected to laser etching, using a 50 W Nd-YAG laser having a frequency of 1064 nm, a scan speed of 100 mm/sec, and a beam diameter of 50 micrometers. A scanning electron microscope image of the aluminum plate is illustrated in FIG. 15. The etched plate had stripes having a width of 50 micrometers, a depth of 50 micrometers, and a distance between each stripe of 150 micrometers Using a Sumitomo heavy industry SE100EV injection molding machine, a polyether imide resin was injection molded to contact the aluminum plates. Two types of polyether imide resin were used. One polyetherimide had a glass transition temperature of 217° C. (measured by DSC), a melt flow rate 17.8 g/10 min at 337° C./6.6 kg, and had no glass fiber content. Another polyetherimide had a glass transition temperature of 217° C. (measured by DSC), a melt flow rate 7.6 g/10 min at 337° C./6.6 kg, and had a glass fiber content of 30 wt %. The injected resin had a temperature of 380° C. Using an electric heater/cooler (e.g., a Heat & Cool tool), the aluminum was heated to a temperature of 180, 200, 240 or 280° C. at the time of the injection molding by heating the mold which heated the aluminum insert, as illustrated in FIG. 5. After the injection of the melted resin, the aluminum was actively cooled to 180° C. The final size of the injection molded resin was 3 mm×45 mm×10 mm. The aluminum plate and the injection molded resin had a bonding area of 50 mm².

A tensile shear bonding strength test was performed on the six samples, based on ISO 19095. A Shimadzu AG-IS was used, with a 10 kN load cell, a tensile speed of 10 mm/min, a temperature of 23° C., at a relative humidity of 50%. The direction of the applied shear was parallel to the bonded surface, as shown in FIG. 10B. The test results are shown in Tables 7 and 8.

TABLE 7

Polyether-imide (no filler)/aluminum plate tensile shear bonding strength.

| | Bonding strength (MPa) | |
|---|---|---|
| Insert metal temperature | Laser etched aluminum plate | Chemically etched aluminum plate |
| 180° C. | 0 | 0 |
| 200° C. | 12 | 0 |
| 240° C. | 35 | 4 |
| 280° C. | 51 | 28 |

TABLE 8

Polyetherimide (Glass fiber 30 wt %)/aluminum plate tensile shear bonding strength.

| | Bonding strength (MPa) | |
|---|---|---|
| Insert metal temperature | Laser etched aluminum plate | Chemically etched aluminum plate |
| 180° C. | 0 | 0 |
| 200° C. | 11 | 0 |

TABLE 8-continued

Polyetherimide (Glass fiber 30 wt %)/aluminum
plate tensile shear bonding strength.

| Insert metal temperature | Bonding strength (MPa) | |
|---|---|---|
| | Laser etched aluminum plate | Chemically etched aluminum plate |
| 240° C. | 38 | 5 |
| 280° C. | 54 | 29 |

As can be seen from the information above, it was unexpectedly discovered that heating the metal insert (e.g., at least the surface of the metal insert) to a high temperature, better adhesion is attained. For example, it allows the plastic to flow into the pores and fully fill the pores. It was also unexpectedly discovered that a PBT/PET blend attains better adhesion than PBT without PET.

The terms and expressions that have been employed are used as terms of description and not of limitation, and there is no intention in the use of such terms and expressions of excluding any equivalents of the features shown and described or portions thereof, but it is recognized that various modifications are possible within the scope of the embodiments of the present invention. Thus, it should be understood that although the present invention has been specifically disclosed by specific embodiments and optional features, modification and variation of the concepts herein disclosed may be resorted to by those of ordinary skill in the art, and that such modifications and variations are considered to be within the scope of embodiments of the present invention.

Set forth below are some embodiments of the method and article discussed herein. The following exemplary embodiments are provided, the numbering of which is not to be construed as designating levels of importance:

Embodiment 1 provides a method of forming a junction between a metal form and a solid plastic, the method comprising: contacting a metal form comprising a plurality of pores and a flowable resin composition comprising a polyester, and curing the flowable composition to form the solid plastic, to provide the junction between the metal form and the solid plastic.

Embodiment 2 provides the method of Embodiment 1, wherein the flowable resin composition comprises a polybutylene terephthalate and a polyethylene terephthalate.

Embodiment 3 provides the method of any one of Embodiments 1-2, wherein contacting the metal form and the flowable resin comprises penetrating the pores with the flowable resin composition before the curing.

Embodiment 4 provides the method of any one of Embodiments 1-3, wherein the pores have a diameter of 1 nm to 1 mm.

Embodiment 5 provides the method of any one of Embodiments 1-4, wherein the pores are in a surface of the metal form, wherein the contacting comprises direct contacting between the metal form and the flowable resin composition.

Embodiment 6 provides the method of any one of Embodiments 1-5, further comprising forming the plurality of pores in the metal form.

Embodiment 7 provides the method of any one of Embodiments 1-6, wherein the pores are in a porous adhesion film on the metal form, wherein contacting the metal form and the flowable resin composition comprises contacting the flowable resin composition and the porous adhesion film on the metal form.

Embodiment 8 provides the method of any one of Embodiments 1-7, further comprising placing or generating an adhesion film comprising the plurality of pores on the metal form prior to the contacting of the metal form and the flowable resin composition.

Embodiment 9 provides the method of any one of Embodiments 1-8, wherein the contacting the metal form and the flowable resin composition comprises injection molding the flowable resin composition.

Embodiment 10 provides the method of any one of Embodiments 1-9, further comprising heating at least a portion of the metal form (e.g., heating the plurality of pores, or heating the whole metal form) to a temperature at or above a glass transition temperature of a flowable resin composition Embodiment 11 provides the method of any one of Embodiments 2-10, wherein the polybutylene terephthalate and the polyethylene terephthalate are each independently 0.01 wt % to 99.99 wt % of the flowable resin composition; preferably wherein the polybutylene terephthalate and the polyethylene terephthalate together are 0.01 wt % to 99.99 wt % of the flowable resin composition.

Embodiment 12 provides the method of any one of the preceding Embodiments, wherein the flowable resin composition comprises at least one of (a) at least two polyethylene terephthalate polymers having different viscosities, and (b) at least two polybutylene terephthalate polymers having different viscosities; preferably, wherein the different viscosities are different by 0.01 to 1.5 dL/g, preferably 0.1 to 0.8 dL/g, as measured at room temperature in a 60:40 phenol/tetrachloroethane mixture; and preferably wherein each viscosity is 0.01 dL/g to 10 dL/g, preferably 0.05 dL/g to 2 dL/g.

Embodiment 13 provides the method of any one of the preceding Embodiments, wherein greater than 20 wt % of the flowable resin composition is the polyethylene terephthalate; preferably wherein greater than 30 wt % and less than or equal to 99 wt % of the flowable resin composition is the polyethylene terephthalate; more preferably greater than 30 wt % up to 70 wt %, of the flowable resin composition is the polyethylene terephthalate; or preferably greater than 32 wt % up to 50 wt %, of the flowable resin composition is the polyethylene terephthalate.

Embodiment 14 provides the method of any one of Embodiments 2-13, wherein the polybutylene terephthalate comprises at least two different polybutylene terephthalate polymers, at least two of which have a different viscosity.

Embodiment 15 provides the method of any one of Embodiments 1-14, wherein the polyethylene terephthalate comprises at least two different polyethylene terephthalate polymers, at least two of which have a different viscosity.

Embodiment 16 provides the method of any one of Embodiments 1-15, wherein the flowable resin composition further comprises a filler.

Embodiment 17 provides the method of any one of Embodiments 1-16, wherein bonding strength between the metal form and the solid plastic is 30 MPa to 100 MPa.

Embodiment 18 provides the method of any one of Embodiments 1-16, wherein the plurality of pores are in a roughened surface of a metal form; further comprising heating the roughened surface to a temperature at or above a glass transition temperature of the flowable resin composition; and optionally cooling the roughened surface of the metal form.

Embodiment 19 provides a junction between a metal form and a solid plastic, the junction comprising: a metal form comprising a plurality of pores and a solid plastic comprising a polybutylene terephthalate and a polyethylene terephthalate; wherein the solid plastic comprises a plurality of anchors, each anchor extending into one of the pores, and the polyethylene terephthalate is greater than 30 wt % and equal to or less than 99 wt % of the solid plastic.

Embodiment 20 provides a method of forming a junction between a metal form and a solid plastic, the method comprising: heating a roughened surface of a metal form to a temperature at or above a glass transition temperature of a flowable resin composition; contacting the roughened surface of the metal form and the flowable resin composition; cooling the roughened surface of the metal form; and curing the flowable composition to form the solid plastic, to provide the junction between the metal form and the solid plastic.

Embodiment 21 provides the method of Embodiment 20, wherein the roughened surface comprises surface structures having at least one dimension approximately parallel to the metal surface of 1 nm to 1 mm.

Embodiment 22 provides the method of Embodiment 21, wherein the surface structures comprise concave surface structures, convex surface structures, pores, dots, lines, or a combination thereof, preferably wherein forming the roughened surface comprises at least one of mechanical machining and chemical machining, preferably forming the roughened surface comprises at least one of mill machining, lathe machining, computer number control (CNC) machining, blasting, filing, laser etching, oxidation, plasma etching, and chemical etching. For example, forming the roughened surface comprises chemical etching.

Embodiment 23 provides the method of Embodiment 22, wherein the pores have a diameter of 1 nm to 1 mm.

Embodiment 24 provides the method of any one of Embodiments 20-23, wherein the method further comprises forming the roughened surface on the metal form, the forming comprising chemical etching, laser etching, laser heating, plasma etching, forming a roughened coating, or a combination thereof.

Embodiment 25 provides the method of any one of Embodiments 21-24, wherein the surface structures are directly in a surface of the metal form, wherein the contacting comprises direct contacting between the metal form and the flowable resin composition.

Embodiment 26 provides the method of any one of Embodiments 21-25, wherein the surface structures are in an adhesion film on the surface of the metal form, wherein contacting the metal form and the flowable resin composition comprises contacting the flowable resin composition and the adhesion film on the metal form.

Embodiment 27 provides the method of any one of Embodiments 20-26, wherein the contacting the metal form and the flowable resin composition comprises injection molding the flowable resin composition.

Embodiment 28 provides the method of any one of Embodiments 20-27, wherein the flowable resin composition comprises a polymer that is amorphous at standard temperature and pressure, a polymer that is crystalline at standard temperature and pressure, or a combination thereof.

Embodiment 29 provides the method of any one of Embodiments 20-28, wherein the flowable resin composition includes a polymer that is amorphous at standard temperature and pressure and that is chosen from a polycarbonate polymer (PC), a polyetherimide polymer (PEI), a polyphenylene oxide polymer (PPO), a polyamide (PA), a polymethylmethacrylate polymer (PMMA), a polyvinylchloride polymer (PVC), an acrylonitrile butadiene styrene polymer (ABS), a polystyrene polymer (PS), a polyethersulfone polymer (PES), a polyamideimide polymer (PAI), a polyarylate polymer, and a polysulfone (PSU).

Embodiment 30 provides the method of any one of Embodiments 20-29, wherein 0.01 wt % to 100 wt %, preferably 90 wt % to 100 wt %, of the flowable resin is one or more polymers that are together amorphous at standard temperature and pressure.

Embodiment 31 provides the method of any one of Embodiments 20-30, wherein the flowable resin composition includes a polymer that is 10 vol % to 80 vol % crystalline at standard temperature and pressure and that is chosen from a polybutylene terephthalate polymer (PBT), a polyphenylene sulfide polymer (PPS), a polyamide polymer (PA or nylon), a polytetrafluoroethylene polymer (PTFE), a linear polyethylene polymer (PE), a polypropylene polymer (PP), a polyetherketone polymer (PEK), a polyetheretherketone polymer (PEEK), a polyetherketoneketone polymer (PEKK), a polyphthalamide polymer (PPA), and a polyoxymethylene polymer (POM).

Embodiment 32 provides the method of any one of Embodiments 20-31, wherein 0.01 wt % to 100 wt % of the flowable resin is one or more polymers that are together 10 vol % to 80 vol % crystalline at standard temperature and pressure.

Embodiment 33 provides the method of any one of Embodiments 20-32, wherein the heating the roughened surface of the metal form comprises heating prior to, during, or a combination thereof, the contacting of the roughened surface and the flowable resin composition.

Embodiment 34 provides the method of any one of Embodiments 20-33, wherein the heating the roughened surface of the metal form comprises heating with steam, an electric heater, an induction heater, ultrasonic vibration, a laser heater, a halogen heater, a carbon heater, or a combination thereof.

Embodiment 35 provides the method of any one of Embodiments 20-34, wherein the heating the roughened surface of the metal form comprises heating a mold comprising the metal form, wherein the heating of the mold heats the metal form.

Embodiment 36 provides the method of any one of Embodiments 20-35, wherein the heating the roughened surface of the metal form comprises directly heating the metal form.

Embodiment 37 provides the method of Embodiment 36, wherein directly heating the metal form comprises heating the metal form with a heating source that is embedded in a mold that comprises the metal form.

Embodiment 38 provides the method of any one of Embodiments 20-37, wherein the heating the roughened surface of the metal form comprises heating with a heating device that is inserted in a mold comprising the metal form or between cavities in the mold prior to the contacting of the roughened surface and the flowable resin composition.

Embodiment 39 provides the method of any one of Embodiments 20-38, wherein contacting the roughened surface of the metal form and the flowable resin composition comprises contacting the roughened surface of the metal form and the flowable resin composition while maintaining the temperature of the roughened surface at or above the glass transition temperature of the flowable resin composition.

Embodiment 40 provides the method of any one of Embodiments 20-39, wherein the heating of the roughened surface and a surface treatment to form the roughened surface are at least partially simultaneous.

Embodiment 41 provides the method of any one of Embodiments 20-40, wherein the cooling of the roughened surface of the metal form comprises passive cooling.

Embodiment 42 provides the method of any one of Embodiments 20-41, wherein the cooling of the roughened surface of the metal form comprises directly cooling the roughened surface of the metal form, a mold comprising the metal form, or a combination thereof, with one or more coolers.

Embodiment 43 provides the method of any one of Embodiments 20-42, wherein bonding strength between the metal form and the solid plastic is 1 MPa to 100 MPa.

Embodiment 44 provides a method of forming a junction between a metal form and a solid plastic, the method comprising: heating a roughened surface of a metal form to a temperature at or above a glass transition temperature of a flowable resin composition, wherein 40 wt % to 100 wt % of the flowable resin composition is one or more polymers that are amorphous at standard temperature and pressure; contacting the roughened surface of the metal form and the flowable resin composition while maintaining the temperature of the roughened surface at or above the glass transition temperature of the flowable resin composition; cooling the roughened surface of the metal form; and curing the flowable composition to form the solid plastic, to provide the junction between the metal form and the solid plastic.

Embodiment 45 provides a junction between a metal form and a solid plastic, the junction comprising: a metal form comprising a roughened surface and a solid plastic, the roughened surface comprising a plurality of surface structures each having at least one dimension approximately parallel to the metal surface of 1 nm to 1 mm, the surface structures comprising convex surface structures, concave surface structures, or a combination thereof, wherein 40 wt % to 100 wt % of the solid plastic is one or more polymers that are amorphous at standard temperature and pressure; wherein the solid plastic comprises a plurality of anchors, each anchor extending substantially to a bottom of a concave surface structure or substantially to a bottom of a cavity formed between multiple convex surface structures.

Embodiment 46 provides a method of forming a junction between a metal form and a solid plastic, the method comprising: contacting a metal form comprising a plurality of pores and a flowable resin composition comprising a polybutylene terephthalate, a polyethylene terephthalate, and a filler; wherein the polyethylene terephthalate is greater than 30 wt % and less than or equal to 99 wt % of the flowable resin composition, and the filler is 1 wt % to about 50 wt % of the flowable resin composition; and curing the flowable composition to form the solid plastic, to provide the junction between the metal form and the solid plastic.

Embodiment 47 provides the method or junction of any one or any combination of Embodiments 1-46 optionally configured such that all elements or options recited are available to use or select from.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1/% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

In this document, the terms "a," "an," or "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed herein, and not otherwise defined, is for the purpose of description only and not of limitation. Any use of section headings is intended to aid reading of the document and is not to be interpreted as limiting; information that is relevant to a section heading may occur within or outside of that particular section.

In the methods described herein, the acts can be carried out in any order without departing from the principles of the invention, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

The term "about" as used herein can allow for a degree of variability in a value or range, for example, within 10%, within 5%, or within 1% of a stated value or of a stated limit of a range, and includes the exact stated value or range. The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%.

This application claims priority to US Provisional Application No. 62/173,583 filed Jun. 10, 2015, which is incorporated herein in its entirety by reference.

The term "radiation" as used herein refers to energetic particles travelling through a medium or space. Examples of radiation are visible light, infrared light, microwaves, radio waves, very low frequency waves, extremely low frequency waves, thermal radiation (heat), and black-body radiation. The term "UV light" as used herein refers to ultraviolet light, which is electromagnetic radiation with a wavelength of about 10 nm to about 400 nm.

The term "cure" as used herein refers to exposing to radiation in any form, heating, or allowing to undergo a physical or chemical reaction that results in hardening or an increase in viscosity.

The term "pore" as used herein refers to a depression, slit, or hole of any size or shape in a solid object. A pore can run all the way through an object or partially through the object. A pore can intersect other pores.

The term "room temperature" as used herein refers to a temperature of about 15° C. to 28° C.

The term "coating" as used herein refers to a continuous or discontinuous layer of material on the coated surface, wherein the layer of material can penetrate the surface and can fill areas such as pores, wherein the layer of material can have any three-dimensional shape, including a flat or curved plane. In one example, a coating can be formed on one or more surfaces, any of which may be porous or nonporous, by immersion in a bath of coating material.

The term "surface" as used herein refers to a boundary or side of an object, wherein the boundary or side can have any perimeter shape and can have any three-dimensional shape, including flat, curved, or angular, wherein the boundary or side can be continuous or discontinuous.

As used herein, the term "polymer" refers to a molecule having at least one repeating unit and can include copolymers.

Unless specified to the contrary herein, all test standards (including ISO, ASTM, and others) are the most recent standard in effect as of the Jun. 10, 2015.

Illustrative types of polyethylene include, for example, ultra high molecular weight polyethylene (UHMWPE), ultra low molecular weight polyethylene (ULMWPE), high molecular weight polyethylene (HMWPE), high density polyethylene (HDPE), high density cross-linked polyethylene (HDXLPE), cross-linked polyethylene (PEX or XLPE), medium density polyethylene (MDPE), low density polyethylene (LDPE), linear low density polyethylene (LLDPE) and very low density polyethylene (VLDPE).

As used herein, the term "injection molding" refers to a process for producing a molded part or form by injecting a composition including one or more polymers that are thermoplastic, thermosetting, or a combination thereof, into a mold cavity, where the composition cools and hardens to the configuration of the cavity. Injection molding can include the use of heating via sources such as steam or induction to heat the mold prior to injection, and the use of cooling sources such as water to cool the mold after injection, allowing faster mold cycling and higher quality molded parts or forms. An insert for an injection mold can form any suitable surface within the mold, such as a surface that contacts at least part of the injection molded material, such as a portion of an outer wall of the mold, or such as at least part of an inner portion of the mold around which the injection molded material is molded. An insert for an injection mold can be an insert that is designed to be separated from the injection molded material at the conclusion of the injection molding process. An insert for an injection mold can be an insert that is designed to be part of the injection molded product (e.g., a heterogeneous injection molded product that includes the insert bonded to the injection molded material), wherein the injection molded product includes a junction between the injection molded material and the insert.

What is claimed is:

1. A method of forming a junction between a metal form and a solid plastic, the method comprising:
   contacting a metal form comprising a plurality of pores and a flowable resin composition comprising a polyester; and
   curing the flowable composition to form the solid plastic, to provide the junction between the metal form and the solid plastic;
   wherein the flowable resin composition comprises at least two polyethylene terephthalate polymers having different viscosities in an amount of 40 to 99.9 weight percent and at least two polybutylene terephthalate polymers having different viscosities in an amount of 0.1 to 60 weight percent;
   wherein weight percent is based on a total weight of the polyethylene terephthalate and the polybutylene terephthalate.

2. The method of claim 1, wherein the pores are in a surface of the metal form, wherein the contacting comprises direct contacting between the metal form and the flowable resin composition.

3. The method of claim 1, wherein the metal form comprises a porous adhesion film, and wherein the pores are in the porous adhesion film, wherein contacting the metal form and the flowable resin composition comprises contacting the flowable resin composition and the porous adhesion film on the metal form.

4. The method of claim 1, further comprising heating the metal form to a temperature at or above a glass transition temperature of a flowable resin composition.

5. The method of claim 4, wherein the heating comprises heating with steam, an electric heater, an induction heater, ultrasonic vibration, a laser heater, a halogen heater, a carbon heater, or a combination thereof.

6. The method of claim 4, wherein the heating comprises heating a mold comprising the metal form, wherein the heating of the mold heats the metal form.

7. The method of claim 4, wherein the heating comprises heating with a heating device that is inserted in a mold comprising the metal form or between cavities in the mold prior to the contacting of the metal form and the flowable resin composition.

8. The method of claim 4, wherein the heating comprises directly heating the metal form.

9. The method of claim 1, wherein the contacting the metal form and the flowable resin composition comprises injection molding the flowable resin composition.

10. The method of claim 1, wherein the flowable resin composition further comprises a filler.

11. The method of any of the preceding claims, wherein the different viscosities are different by 0.01 to 1.5 dL/g, as measured at room temperature in a 60:40 phenol/tetrachloroethane mixture.

12. The method of any of the preceding claims, wherein each viscosity is 0.01 dL/g to 10 dL/g.

13. The method of any of the preceding claims, wherein contacting the metal form and the flowable resin comprises penetrating the pores with the flowable resin composition before the curing.

* * * * *